United States Patent
Brown

(10) Patent No.: US 12,441,226 B1
(45) Date of Patent: Oct. 14, 2025

(54) HEIGHT ADJUSTABLE TRAILERS AND TRUCKS AND METHODS OF OPERATION THEREOF

(71) Applicant: Amazon Technologies, Inc., Seattle, WA (US)

(72) Inventor: Andre David Brown, Holliston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 417 days.

(21) Appl. No.: 18/177,291

(22) Filed: Mar. 2, 2023

(51) Int. Cl.
*B60P 1/02* (2006.01)
*B60G 7/00* (2006.01)

(52) U.S. Cl.
CPC .............. *B60P 1/027* (2013.01); *B60G 7/006* (2013.01); *B60G 2300/04* (2013.01); *B60G 2500/30* (2013.01)

(58) Field of Classification Search
CPC . B60P 1/027; B60P 1/02; B60G 7/006; B60G 2300/04; B60G 2300/042; B60G 2500/30
See application file for complete search history.

(56) References Cited

U.S. PATENT DOCUMENTS

| | | | | |
|---|---|---|---|---|
| 7,618,227 B2 * | 11/2009 | Smith | ................ | B60P 1/027 280/43.23 |
| 9,649,967 B2 * | 5/2017 | Weldy | ................ | B60P 1/08 |
| 11,351,903 B1 * | 6/2022 | Williamson | ........... | B60P 1/027 |
| 11,780,284 B2 * | 10/2023 | Cervantes | ............... | B60P 1/027 280/6.151 |

OTHER PUBLICATIONS

Flex Trailers Inc., "E-16 XL," www.airtow.com, Flex Trailers Inc., accessed on Feb. 15, 2023, URL: https://airtow.com/models/e-16-xl/.
Futura Trailers, "Futura Trailers," www.futuratrailers.com., Dealer Spike, LLC and Futura Trailers, accessed on Feb. 15, 2023, Copyright 2023, URL: https://www.futuratrailers.com/.
Mobile Lift Concepts, "Mobile Lift Concepts: Mobile Lift, Inspection and Service Trailers," www.mobileliftconcepts.com, Mobile Lift Concepts, accessed on Feb. 15, 2023, Copyright 2014, URL: https://www.mobileliftconcepts.com/.

* cited by examiner

*Primary Examiner* — John D Walters
(74) *Attorney, Agent, or Firm* — Athorus, PLLC

(57) ABSTRACT

Height adjustable trailers and trucks may include height adjustment mechanisms having drive wheels, drive motors, power supplies, and suspension linkages. For example, the suspension linkages may be moved between various positions to adjust the height of a chassis or cargo box of a trailer or truck. In addition, lock mechanisms associated with the suspension linkages may hold various positions and associated heights of the chassis or cargo box. Further, the various heights of the chassis or cargo box may also be associated with different wheelbases of the trailer or truck. The height adjustable trailers or trucks may improve safety, ergonomics, speed, and efficiency of various operations, including transport, loading, unloading, sortation, storage, or others. Moreover, some operations may be (semi-)autonomously performed by trailers having associated control systems, such as various movement, loading, unloading, staging, or other operations within yards of facilities.

20 Claims, 16 Drawing Sheets

HEIGHT ADJUSTABLE TRAILERS AND TRUCKS AND METHODS OF OPERATION THEREOF

BACKGROUND

Many companies may store, package, and ship items and/or groups of items between material handling facilities. For example, many companies may receive, sort, and store items in a material handling facility, and may transport items between various locations via trucks, trailers, or other vehicles. Various material handling systems and processes involving such vehicles, including loading, transport, receipt, unloading, storage, or other processing of items, often incur significant cost and time. Accordingly, there is a need for improved height adjustable trailers and trucks to facilitate the various material handling and transport processes by and between material handling facilities or other locations, thereby improving the safety, speed, and efficiency of such processes.

DETAILED DESCRIPTION

Figure 1A:
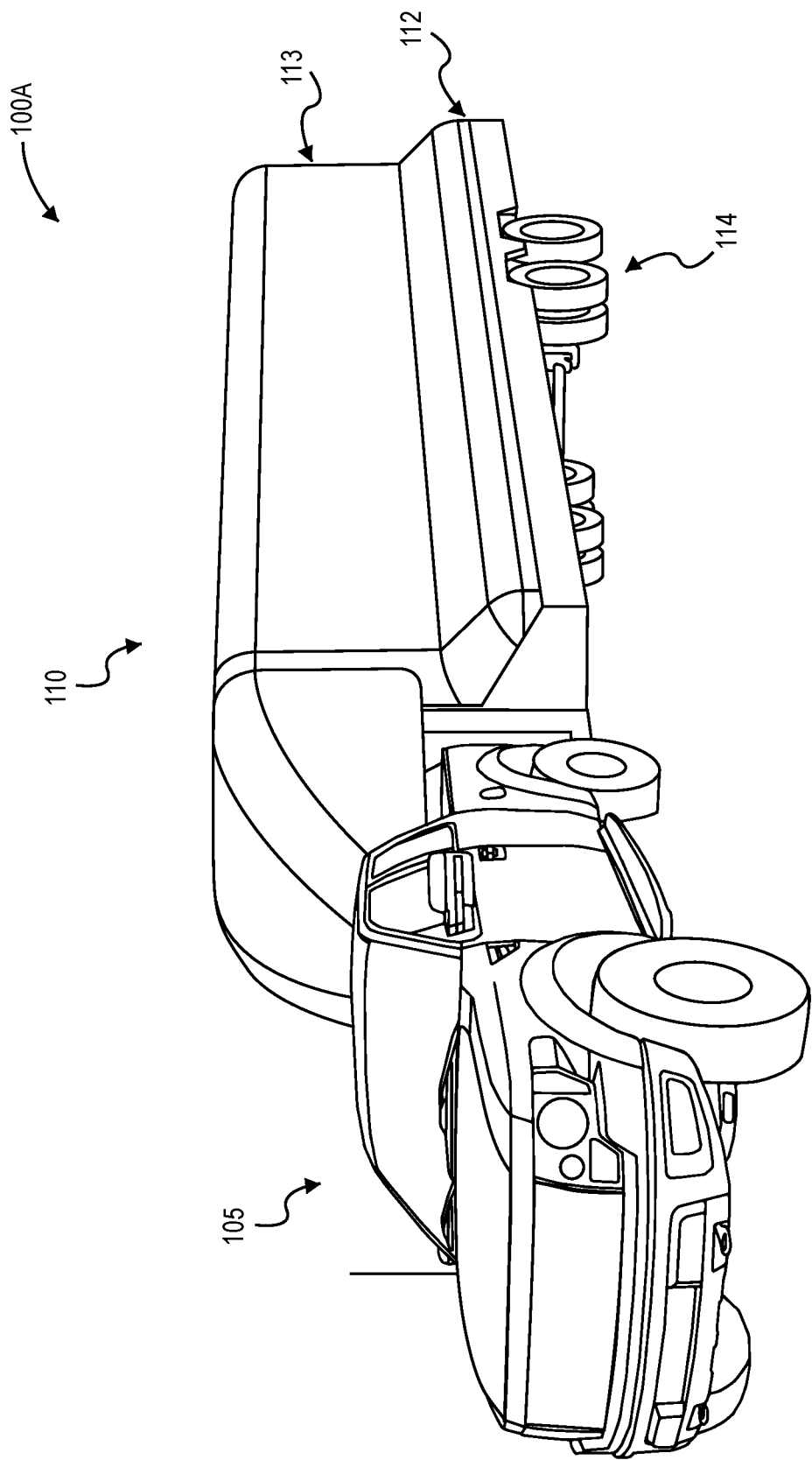
FIG. 1A is a schematic diagram of an example height adjustable trailer, in accordance with implementations of the present disclosure.

As is set forth in greater detail below, implementations of the present disclosure are directed to height adjustable trailers and trucks, associated height adjustment apparatus or mechanisms, and methods of operating such height adjustable trailers and trucks.

In example embodiments described herein, height adjustable trailers and trucks may enable various improvements and operational efficiencies over conventional trailers and trucks. For example, cargo boxes of height adjustable trailers and trucks may be moved to different heights, e.g., associated with loading and/or unloading docks, ground level, or other desired heights. In addition, cargo boxes of height adjustable trailers and trucks may be moved to different heights to improve aerodynamics, range, and/or efficiency during transport, enable passage of such trailers and trucks through height-restricted areas, and/or facilitate transport, movement, loading, unloading, and/or storage at any of various desired heights and/or angles of cargo boxes.

In example embodiments, height adjustable trailers and trucks may comprise height adjustment apparatus or mechanisms to enable movement to desired heights. For example, the height adjustment apparatus or mechanisms may comprise a power supply, a drive wheel, a drive motor, and a suspension linkage. The suspension linkage may be selectively pivotably coupled between the drive motor and a portion of the chassis and/or cargo box of the trailer or truck. In addition, the suspension linkage may be lockable via a lock in one or more desired positions, which may correspond to one or more heights of the chassis and/or cargo box.

During normal transport or movement of a height adjustable trailer or truck, operation of the drive motor via power from the power supply may cause rotation of the drive wheel to drive or propel the height adjustable trailer or truck. In order to adjust a height of the trailer or truck, the lock associated with the suspension linkage and the drive motor may be released. Then, in response to operation of the drive motor, the drive wheel may rotate and cause movement of the suspension linkage to a desired position, thereby causing adjustment to the height of the chassis and/or cargo box of the trailer or truck. As part of the movement of the suspension linkage to the desired position, the drive motor may further cause adjustment to a wheelbase of the trailer or truck, e.g., to shorten or lengthen the wheelbase.

In additional example embodiments, the height adjustment apparatus or mechanisms may be associated with a rear wheel associated with a trailer or truck, and a front wheel associated with the trailer or truck may also be deployable, extendible, and/or retractable. Thus, a height and/or angle of the chassis and/or cargo box may be adjusted by selective extension and/or retraction of the front wheel, in combination with selective height adjustment via the height adjustment apparatus or mechanisms associated with the rear wheel.

In further example embodiments, one or more sensors may be associated with a trailer or truck to capture data associated with an environment. Based on data captured by the sensors, the trailer or truck may be (semi-)autonomously operated to move between locations and/or adjust heights and/or angles to facilitate various operations. For example, within a yard of a material handling facility, the trailer or truck may be (semi-)autonomously operated to facilitate various movement, loading, unloading, storage, sortation, and/or other operations.

Figure 1B:
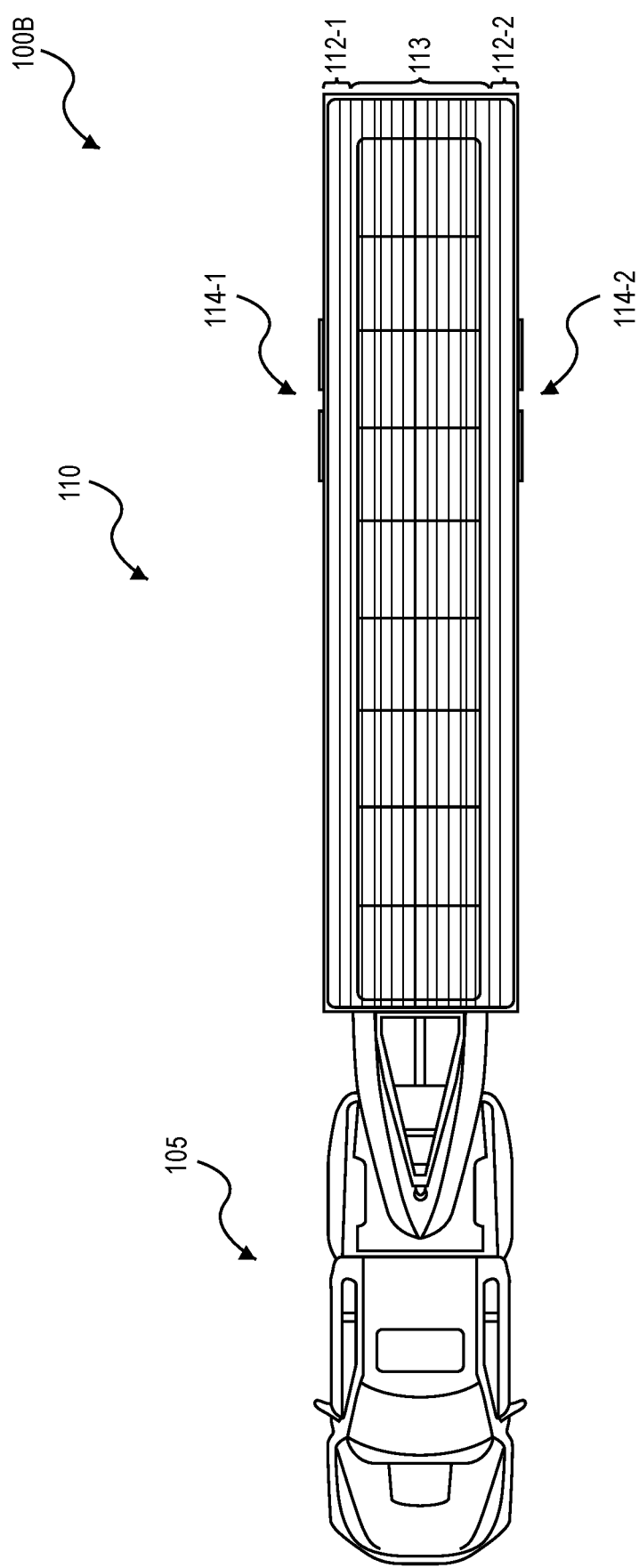
FIG. 1B is a schematic, top view diagram of an example height adjustable trailer, in accordance with implementations of the present disclosure.

FIG. 1A is a schematic diagram 100A of an example height adjustable trailer, in accordance with implementations of the present disclosure, and FIG. 1B is a schematic, top view diagram 100B of an example height adjustable trailer, in accordance with implementations of the present disclosure.

As shown in FIGS. 1A and 1B, an example height adjustable trailer 110 may be pulled, moved, or transported by a truck or tractor 105. The height adjustable trailer 110 may comprise a chassis 112, a cargo box 113, and one or more drive wheels 114. Although FIGS. 1A and 1B illustrate multiple drive wheels 114 on each side of the chassis 112 and cargo box 113, some example embodiments may include only one drive wheel 114 on each side of the chassis 112 and cargo box 113.

In addition, as further shown in FIG. 1B, the chassis 112 may be formed of two portions or sections 112-1, 112-2 that are positioned on opposite, lateral sides of the cargo box 113. Further, each section 112-1, 112-2 of the chassis may include one or more respective drive wheels 114-1, 114-2 that are similarly positioned on opposite, lateral sides of the cargo box 113. Each drive wheel 114-1, 114-2 may include corresponding power supplies, drive motors, suspension linkages, and/or other components associated with respective height adjustment apparatus as further described herein at least with respect to FIGS. 3-4B.

By forming or configuring the two sections 112-1, 112-2 of the chassis on opposite, lateral sides of the cargo box 113, substantially no or only few portions of the chassis 112 or other structural components thereof may extend between opposing sections 112-1, 112-2. Generally, only the cargo box 113, connecting or coupling elements between the chassis sections 112-1, 112-2 and the cargo box 113, and/or portions of the suspension linkages and/or other components of the respective height adjustment apparatus may extend between the opposing sections 112-1, 112-2. As a result, the cargo box 113 may move, translate, slide, pivot, and/or rotate between and relative to the sections 112-1, 112-2 of the chassis. In this manner, the cargo box 113 may move between various desired heights and/or angles relative to the chassis sections 112-1, 112-2 as further described herein at least with respect to FIGS. 2A-2C.

Figure 2A:
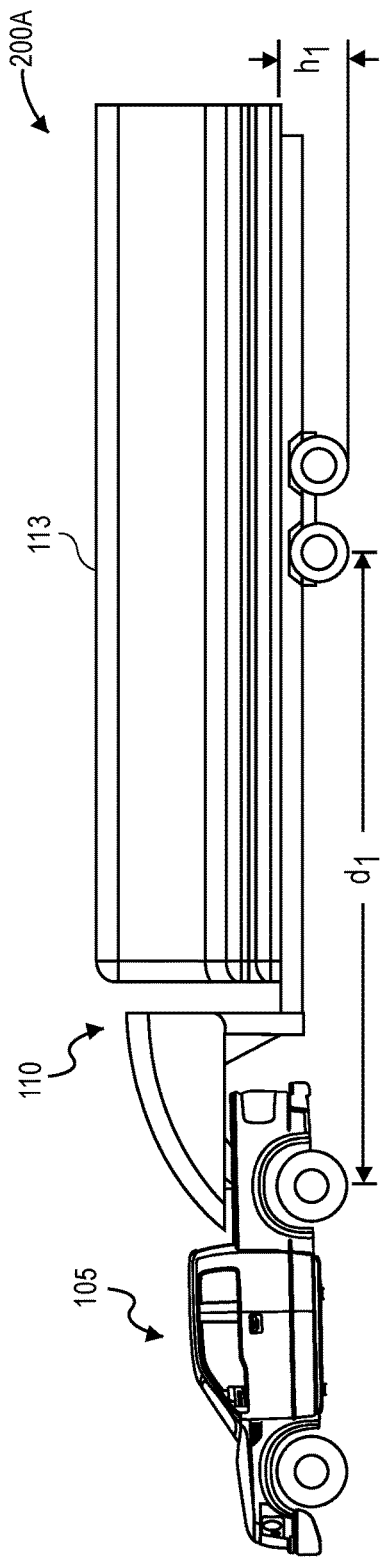
FIG. 2A is a schematic, side view diagram of an example height adjustable trailer in a raised position, in accordance with implementations of the present disclosure.
Figure 2B:
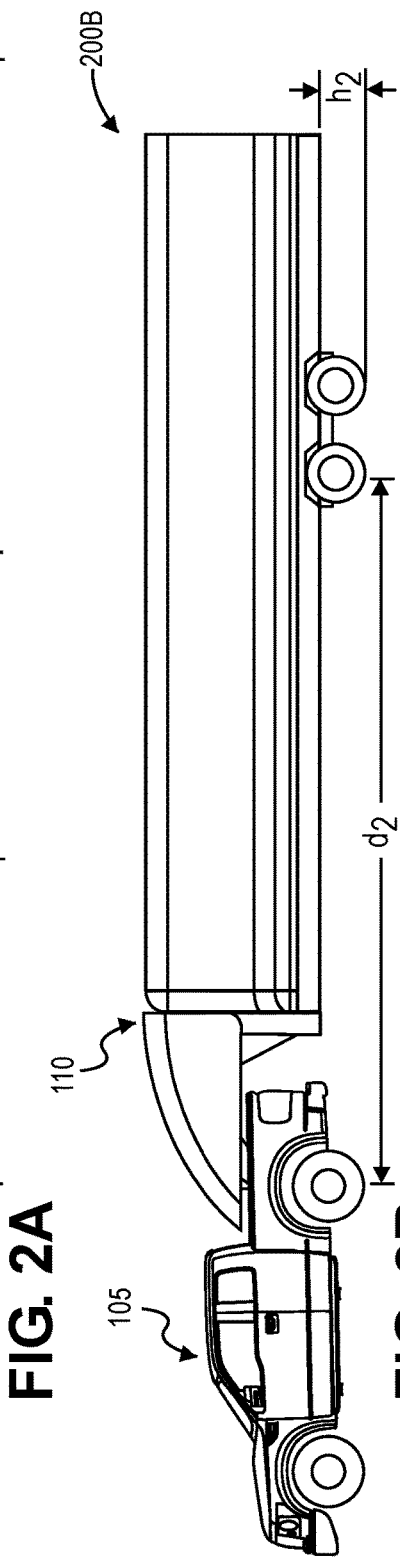
FIG. 2B is a schematic, side view diagram of an example height adjustable trailer in a transport position, in accordance with implementations of the present disclosure.
Figure 2C:
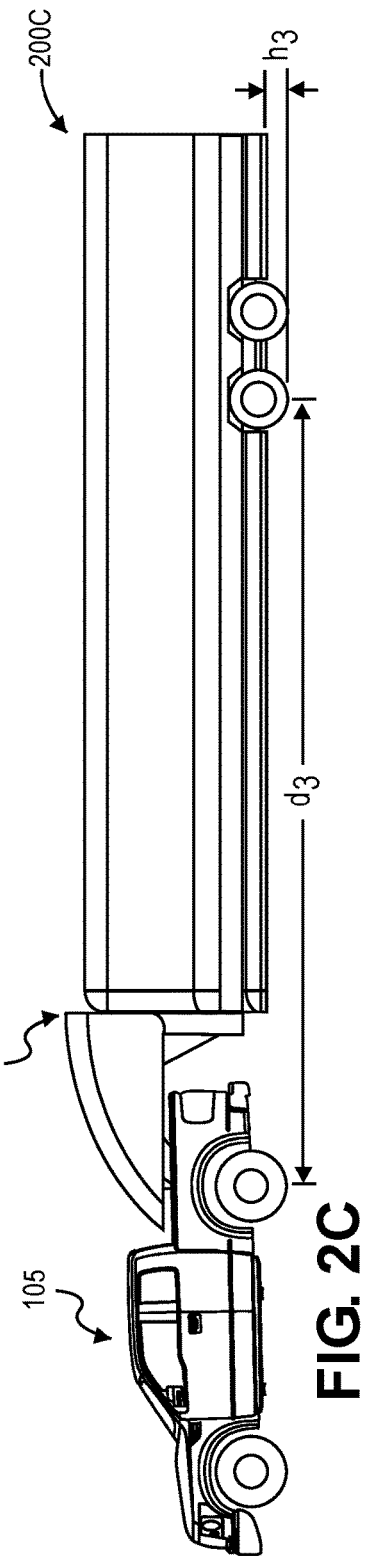
FIG. 2C is a schematic, side view diagram of an example height adjustable trailer in a lowered position, in accordance with implementations of the present disclosure.

FIG. 2A is a schematic, side view diagram 200A of an example height adjustable trailer in a raised position, in accordance with implementations of the present disclosure, FIG. 2B is a schematic, side view diagram 200B of an example height adjustable trailer in a transport position, in accordance with implementations of the present disclosure, and FIG. 2C is a schematic, side view diagram 200C of an example height adjustable trailer in a lowered position, in accordance with implementations of the present disclosure.

The example height adjustable trailer 110 illustrated in FIGS. 2A-2C may include any and all of the features of the height adjustable trailer 110 described herein at least with respect to FIGS. 1A and 1B.

As shown in FIG. 2A, the cargo box 113 of the trailer 110 may be at a first, raised height relative to the chassis and other portions of the trailer 110, e.g., for loading and/or unloading operations. By operating the height adjustment apparatus associated with the drive wheel, the cargo box 113 may move to the raised height $h_1$ relative to the ground. For example, the raised height $h_1$ may be associated with a height of a dock or other platform for loading and/or unloading cargo to and/or from the cargo box 113. Further, the operation of the height adjustment apparatus to move the cargo box 113 to the raised height $h_1$ may also cause adjustment to the wheelbase of the trailer 110. In the example of FIG. 2A, raising the cargo box 113 to the raised height $h_1$ may cause corresponding shortening of the wheelbase to the shortened wheelbase $d_1$, which may be measured between a rear wheel of the truck or tractor 105 and the drive wheel 114 of the trailer 110 in this example embodiment.

As shown in FIG. 2B, the cargo box 113 of the trailer 110 may be at a second, nominal height relative to the chassis and other portions of the trailer 110, e.g., for transport operations. By operating the height adjustment apparatus associated with the drive wheel, the cargo box 113 may move to the nominal height $h_2$ relative to the ground. For example, the nominal height $h_2$ may be associated with a transport or drive height for the cargo box 113. Further, the operation of the height adjustment apparatus to move the cargo box 113 to the nominal height $h_2$ may also cause adjustment to the wheelbase of the trailer 110. In the example of FIG. 2B, moving the cargo box 113 to the nominal height $h_2$ may adjust the wheelbase to the nominal wheelbase $d_2$ that is greater than the shortened wheelbase $d_1$, which may be measured between a rear wheel of the truck or tractor 105 and the drive wheel 114 of the trailer 110 in this example embodiment.

The nominal height $h_2$ of the cargo box 113, as compared to the raised height $h_1$ shown in FIG. 2A, may generally reduce a frontal area of the cargo box 113 and also lower a ride height of the cargo box 113. These changes may consequently reduce the drag and improve aerodynamics associated with the cargo box 113 and trailer 110 as a whole, thereby potentially increasing range and/or efficiency of the trailer 110 and truck 105 during transport.

As shown in FIG. 2C, the cargo box 113 of the trailer 110 may be at a third, lowered height relative to the chassis and other portions of the trailer 110, e.g., for ground-based operations. By operating the height adjustment apparatus associated with the drive wheel 114, the cargo box 113 may move to the lowered height $h_3$ that is lower than each of the raised height $h_1$ and the nominal height $h_2$. For example, the lowered height $h_3$ may be substantially at ground level for various ground-based operations, such as loading and/or unloading cargo to and/or from the cargo box 113 for delivery. Further, the operation of the height adjustment apparatus to move the cargo box 113 to the lowered height $h_3$ may also cause adjustment to the wheelbase of the trailer 110. In the example of FIG. 2C, lowering the cargo box 113 to the lowered height $h_3$ may cause corresponding lengthening of the wheelbase to the lengthened wheelbase $d_3$ that is greater than the nominal wheelbase $d_2$ and the shortened wheelbase $d_1$, which may be measured between a rear wheel of the truck or tractor 105 and the drive wheel 114 of the trailer 110 in this example embodiment.

In some example embodiments, the cargo box 113 of the trailer 110 may be moved, via the height adjustment apparatus, to various other desired heights other than those illustrated in FIGS. 2A-2C. In addition, the various desired heights may be associated with various types of operations and/or different locations, e.g., for movement, transport, storage, loading, unloading, sortation, and/or various other operations. By adjusting the height of the cargo box 113 to various desired heights, the safety, ergonomics, speed, and/or efficiency of various operations may be improved.

In alternative example embodiments, the different heights of the cargo box 113 may correspond to different wheelbases of the trailer 110. For example, dependent upon the particular configuration or arrangement of components of the height adjustment apparatus described herein, a raised height of the cargo box 113 may correspond to a lengthened wheelbase, and a lowered height of the cargo box 113 may correspond to a shortened wheelbase. Various other combinations of different heights of the cargo box 113 and different wheelbases of the trailer 110 are also possible based on the particular configuration or arrangement of components of the height adjustment apparatus.

Moreover, in further example embodiments described herein, the cargo box 113 of the trailer 110 may also be angled or tilted at various different desired heights to facilitate performance of various operations. For example, during some stages of transport, tilting or angling of the cargo box 113 may improve safety, speed, and/or efficiency of transport of the trailer 110 by the truck 105, e.g., while traveling along roadways with certain angles or grades, and/or to clear various height restrictions or overhead obstacles. In addition, during various loading, unloading, and/or other operations associated with cargo within the cargo box 113, tilting or angling of the cargo box 113 may improve safety, ergonomics, speed, and/or efficiency of various material handling tasks, e.g., to accommodate or compensate for angles or grades associated with the ground, and/or to match or correspond to angles or grades of surfaces or floors associated with docks or material handling facilities.

Figure 3:
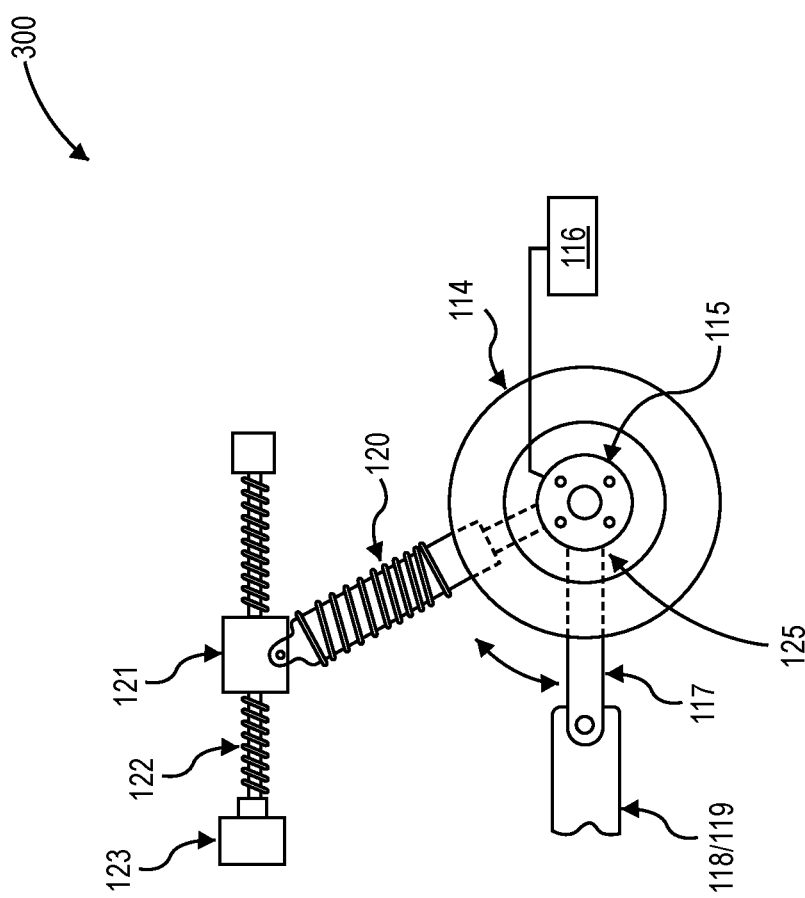
FIG. 3 is a schematic, side view diagram of an example height adjustment mechanism for a trailer or truck, in accordance with implementations of the present disclosure.

FIG. 3 is a schematic, side view diagram 300 of an example height adjustment mechanism for a trailer or truck, in accordance with implementations of the present disclosure.

As described herein, the example height adjustment mechanism may be associated with one or more drive wheels 114 of a trailer or truck, e.g., the trailer 110 illustrated in FIGS. 1A-2C. In addition, each drive wheel 114-1, 114-2 associated with a respective chassis section 112-1, 112-2 on opposing, lateral sides of the cargo box 113, as indicated in FIG. 1B, may have a respective height adjustment mechanism. Generally, one height adjustment mechanism may be associated with each set of rear wheels, e.g., one or more drive wheels 114-1, 114-2, on each opposing, lateral side of the cargo box 113.

As shown in FIG. 3, the height adjustment mechanism may comprise a drive wheel 114, a drive motor 115, a power supply 116, and a suspension linkage 117. The drive wheel 114 may comprise a wheel and associated tire that transmits driving force to the ground to propel or drive the trailer 110 responsive to rotation by the drive motor 115. In addition, the drive wheel 114 may have various sizes or dimensions. The drive motor 115 may comprise an electric motor, e.g., an eAxle (electronic axle), or other types of motors or actuators. For example, the drive motor 115 may be directly or indirectly coupled to the drive wheel 114 to cause rotation of the drive wheel 114 to propel or drive the trailer 110. The power supply 116 may comprise a battery, e.g., a traction battery, or other types of power supplies. Further, the power supply 116 may be operatively connected to the drive motor 115 to provide power to enable rotation of the drive motor 115, and consequent rotation of the drive wheel 114.

The suspension linkage 117 may be pivotably coupled to the drive motor 115 and may also be pivotably coupled to a portion 118, 119 of at least one of the chassis 112 or the cargo box 113 of the trailer 110. The suspension linkage 117 may be formed or configured similar to a trailing arm suspension linkage. In addition, the suspension linkage 117 may comprise a lock 125 to selectively maintain or release a position of the suspension linkage 117 relative to the drive motor 115. For example, the lock 125 may be positioned at a first end of the suspension linkage 117 proximate the drive motor 115, and may selectively hold or maintain one or more desired rotated or pivoted positions of the suspension linkage 117 relative to the drive motor 115, which positions are schematically indicated by the double-ended curved arrow in FIG. 3. In addition, the suspension linkage 117 may be substantially freely pivotable at a second end proximate the pivotable coupling to a portion 118, 119 of at least one of the chassis 112 or the cargo box 113.

The lock 125 associated with the suspension linkage 117 may comprise various different types of locks. For example, the lock 125 may comprise a solenoid and pin that can be selectively inserted or removed from one or more corresponding grooves or holes, in order to selectively prevent or allow relative movement or rotation between the suspension linkage 117 and the drive motor 115. In addition, the lock 125 may comprise a releasable clamp, collar, or other similar rotation locking structures to selectively prevent or allow relative movement or rotation between the suspension linkage 117 and the drive motor 115. Various other types of locks may be used that may selectively prevent or allow relative movement or rotation between the suspension linkage 117 and the drive motor 115.

In some example embodiments in which the second end of the suspension linkage 117 is pivotably coupled to a portion 118 of the chassis 112, changing or rotating the position of the suspension linkage 117 relative to the drive motor 115 may cause raising and lowering of the chassis 112, as well as corresponding raising and lowering of the cargo box 113 that may be attached or coupled to the chassis 112. For example, the position of the suspension linkage 117 as shown in FIG. 3 may correspond to a lowered height of the chassis 112 and cargo box 113. In addition, rotation of the position of the suspension linkage 117 relative to the drive motor 115, e.g., rotating the suspension linkage 117 clockwise around an approximate center of the drive motor 115, may correspond to one or more nominal or raised positions of the chassis 112 and cargo box 113. Further details of such example embodiments are described herein at least with respect to FIG. 4A.

In other example embodiments in which the second end of the suspension linkage 117 is pivotably coupled to a portion 119 of the cargo box 113, changing or rotating the position of the suspension linkage 117 relative to the drive motor 115 may cause raising and lowering of the cargo box 113 relative to the chassis 112. For example, the position of the suspension linkage 117 as shown in FIG. 3 may correspond to a lowered height of the cargo box 113. In addition, rotation of the position of the suspension linkage 117 relative to the drive motor 115, e.g., rotating the suspension linkage 117 clockwise around an approximate center of the drive motor 115, may correspond to one or more nominal or raised positions of the cargo box 113. Further details of such example embodiments are described herein at least with respect to FIG. 4B.

In further example embodiments, as shown in FIG. 3, an adjustable shock absorber subsystem may be coupled to the height adjustment mechanism, and the adjustable shock absorber subsystem may comprise a shock 120, a lead screw nut 121, a lead screw 122, and an actuator 123. The adjustable shock absorber subsystem may cooperate with the suspension linkage 117 to provide shock absorption and improve driving or ride characteristics of the trailer 110, e.g., in response bumps, dips, debris, potholes, or other surface irregularities associated with the ground. Further, the adjustable shock absorber subsystem may be coupled to a portion of the chassis 112 and/or to a portion of the cargo box 113 in various example embodiments.

For example, the shock 120 may be pivotably coupled between the drive motor 115 and the lead screw nut 121. Further, the shock 120 may be extendible or retractable to accommodate various different positions of the suspension linkage 117 and corresponding different heights of at least one of the chassis 112 or cargo box 113. Further, the lead screw nut 121 may be movable via the lead screw 122 and actuator 123 between various positions, e.g., different fore-aft positions. In some further examples, the lead screw 122 may also be positioned at an angle relative to ground to further accommodate various different positions of the suspension linkage 117 and corresponding different heights of at least one of the chassis 112 or cargo box 113. The actuator 123 may comprise various types of rotary actuators or motors configured to rotate the lead screw 122. In response to rotation of the lead screw 122 by the actuator 123, the lead screw nut 121 may move to different positions along the lead screw 122, thereby adjusting or modifying a position of the shock 120 relative to the drive motor 115, the chassis 112, and/or the cargo box 113.

Figure 4A:
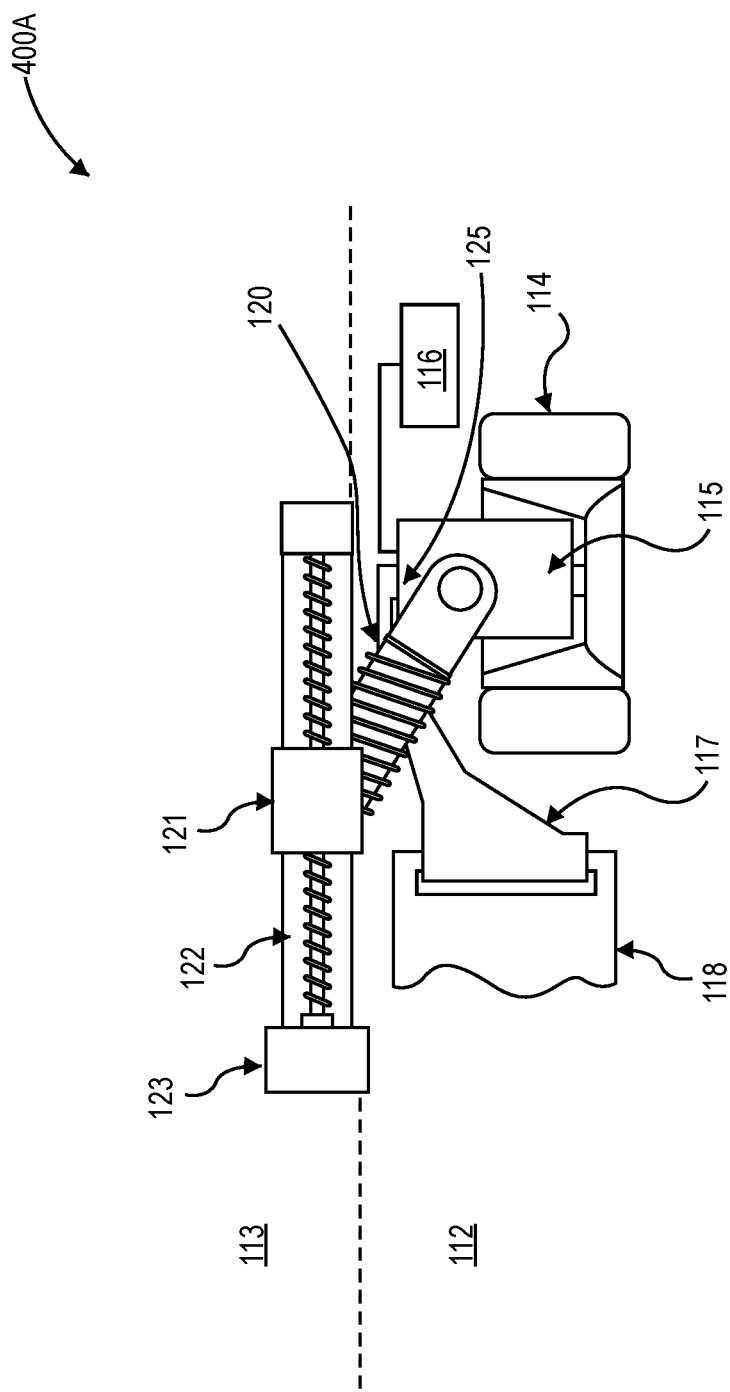
FIG. 4A is a schematic, top view diagram of an example height adjustment mechanism for a trailer or truck, in accordance with implementations of the present disclosure.

FIG. 4A is a schematic, top view diagram 400A of an example height adjustment mechanism for a trailer or truck, in accordance with implementations of the present disclosure. FIG. 4A illustrates a height adjustment mechanism similar to that shown in FIG. 3, and may include any and all of the features described herein at least with respect to FIG. 3.

In the example embodiment illustrated in FIG. 4A, the second end of the suspension linkage 117 distal from the drive motor 115 may be pivotably coupled to a portion 118 of the chassis 112. In addition, the cargo box 113 may be generally statically fixed or coupled to the chassis 112, such that movement of the chassis 112 corresponds to the same or similar movement of the cargo box 113. In this example embodiment, changing or rotating the position of the suspension linkage 117 relative to the drive motor 115, e.g., rotating the suspension linkage 117 relative to the drive motor 115, may cause raising and lowering of the chassis 112 and cargo box 113 together.

For example, in a raised position or orientation of the suspension linkage 117, the chassis 112 and cargo box 113 may be at a raised height. In addition, in the raised position or orientation of the suspension linkage 117, the wheelbase of the trailer may be a shortened wheelbase. In addition, in a nominal or transport position or orientation of the suspension linkage 117, the chassis 112 and cargo box 113 may be at a nominal or transport height. In addition, in the nominal or transport position or orientation of the suspension linkage 117, the wheelbase of the trailer may be a nominal or transport wheelbase. Further, in a lowered position or orientation of the suspension linkage 117, the chassis 112 and cargo box 113 may be at a lowered height. In addition, in the lowered position or orientation of the suspension linkage 117, the wheelbase of the trailer may be a lengthened wheelbase.

Furthermore, the adjustable shock absorber subsystem may be coupled to one or both of the chassis 112 and the cargo box 113. Because the chassis 112 and cargo box 113 may move or change heights together in this example embodiment, the adjustable shock absorber subsystem may be coupled to either or both of the chassis 112 and cargo box 113. In addition, aspects of the adjustable shock absorber subsystem may be configured to enable movement of the chassis 112 and cargo box 113 between the lowered height and the raised height relative to the position of the drive motor 115, as well as the drive wheel 114 that remains in contact with the ground.

Figure 4B:
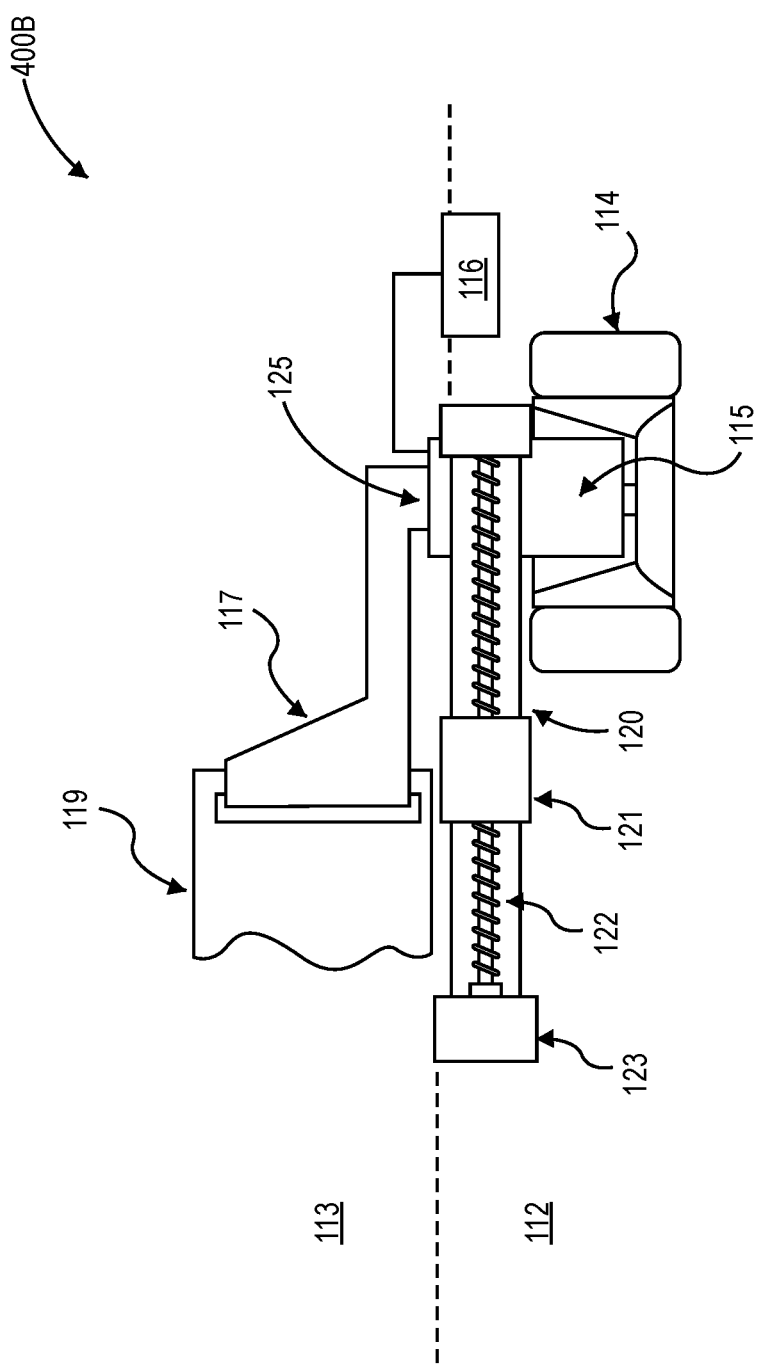
FIG. 4B is a schematic, top view diagram of another example height adjustment mechanism for a trailer or truck, in accordance with implementations of the present disclosure.

FIG. 4B is a schematic, top view diagram 400B of another example height adjustment mechanism for a trailer or truck, in accordance with implementations of the present disclosure. FIG. 4B illustrates another height adjustment mechanism similar to that shown in FIG. 3, and may include any and all of the features described herein at least with respect to FIG. 3.

In the example embodiment illustrated in FIG. 4B, the second end of the suspension linkage 117 distal from the drive motor 115 may be pivotably coupled to a portion 119 of the cargo box 113. In addition, the cargo box 113 may be movable, slidable, pivotable, and/or rotatable relative to the chassis 112, such that the chassis 112 may remain at a relatively fixed or static height relative to the ground while the cargo box 113 may move between various different heights. In this example embodiment, changing or rotating the position of the suspension linkage 117 relative to the drive motor 115, e.g., rotating the suspension linkage 117 relative to the drive motor 115, may cause raising and lowering of the cargo box 113 relative to the chassis 112.

For example, in a raised position or orientation of the suspension linkage 117, the cargo box 113 may be at a raised height, similar to that shown in FIG. 2A. In addition, in the raised position or orientation of the suspension linkage 117, the wheelbase of the trailer may be a shortened wheelbase. In addition, in a nominal or transport position or orientation of the suspension linkage 117, the cargo box 113 may be at a nominal or transport height, similar to that shown in FIG. 2B. In addition, in the nominal or transport position or orientation of the suspension linkage 117, the wheelbase of the trailer may be a nominal or transport wheelbase. Further, in a lowered position or orientation of the suspension linkage 117, the cargo box 113 may be at a lowered height, similar to that shown in FIG. 2C. In addition, in the lowered position or orientation of the suspension linkage 117, the wheelbase of the trailer may be a lengthened wheelbase.

Furthermore, the adjustable shock absorber subsystem may generally be coupled to the chassis 112. Because the cargo box 113 may move or change heights relative to the chassis 112 in this example embodiment, the adjustable shock absorber subsystem may be coupled to the chassis 112 to improve driving or ride characteristics of the trailer. In addition, aspects of the adjustable shock absorber subsystem may be configured to enable movement of the cargo box 113 between the lowered height and the raised height relative to the position of the drive motor 115, as well as the drive wheel 114 that remains in contact with the ground.

Although FIGS. 3-4B illustrate particular example configurations and arrangements of various components of a height adjustment mechanism, other example embodiments may include various other configurations and arrangements of components of a height adjustment mechanism to adjust the height of a trailer or truck. For example, the suspension linkage may have various different sizes, shapes, or dimensions. In addition, the first end of the suspension linkage may be pivotably coupled to various different portions of the drive motor, or the first end of the suspension linkage may be pivotably coupled to other components proximate the drive motor. Further, the adjustable shock absorber subsystem may be formed by various different mechanisms, actuators, components, or elements other than those illustrated herein.

In additional example embodiments, in addition to the drive or motive force exerted by the drive motor and drive wheel to adjust or rotate a position of the suspension linkage, the height adjustment mechanism may further comprise various cams, associated cables, and motors or actuators to facilitate or assist rotation of a suspension linkage relative a drive motor to adjust the height of a trailer or truck. In further example embodiments, in addition to the drive or motive force exerted by the drive motor and drive wheel to adjust or rotate a position of the suspension linkage, the height adjustment mechanism may comprise various linear actuators, rotary actuators, hydraulic cylinders, and/or other actuators or motors to further facilitate or assist rotation of a suspension linkage relative a drive motor to adjust the height of a trailer or truck. Such additional actuators, motors, or other assistive devices may be operatively coupled between a portion of the suspension linkage and one or more portions of the drive motor, other components of the height adjustment mechanism, and/or the chassis.

Figure 5:
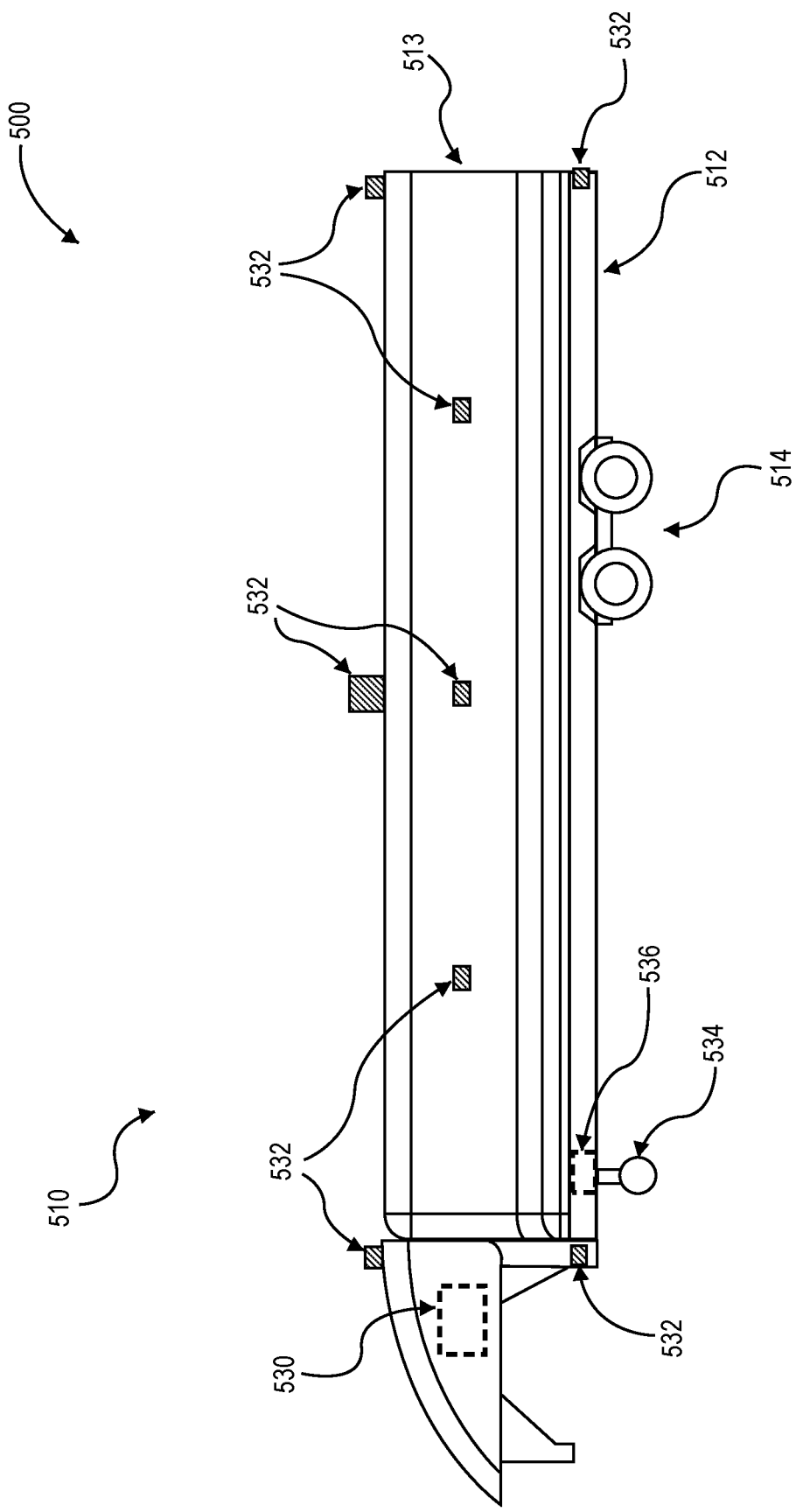
FIG. 5 is a schematic, side view diagram of an example (semi-)autonomous height adjustable trailer, in accordance with implementations of the present disclosure.

FIG. 5 is a schematic, side view diagram 500 of an example (semi-)autonomous height adjustable trailer, in accordance with implementations of the present disclosure.

The example (semi-)autonomous height adjustable trailer 510 illustrated in FIG. 5 may include any and all of the features of the height adjustable trailer 110 and associated height adjustment mechanisms described herein at least with respect to FIGS. 1A-4B.

As shown in FIG. 5, the (semi-)autonomous height adjustable trailer 510 may comprise a chassis, a cargo box 513, one or more drive wheels 514, and respective height adjustment mechanisms associated with the drive wheels 514, as described herein at least with respect to FIGS. 3-4B. The (semi-)autonomous height adjustable trailer 510 may further comprise a vehicle control system 530, one or more sensors 532, one or more front wheels 534, and/or associated motors or actuators 536.

The vehicle control system 530 may comprise one or more processors, memories, controllers, communication devices, interfaces to various other components or peripherals, and/or other components. For example, the vehicle control system 530 may be configured to (semi-)autonomously control operations of the height adjustable trailer 510. In some examples, the vehicle control system 530 may enable (semi-)autonomous control of various transport or movement operations, loading or unloading operations, sortation or storage operations, and/or various other operations, as well as height adjustments associated with various operations. Further details of the vehicle control system 530 are described herein at least with respect to FIG. 12.

The one or more sensors 532 may comprise various types of sensors, such as cameras, imaging devices or sensors, depth sensors, radar sensors, light detection and ranging (LIDAR) sensors, other time of flight or ranging sensors, presence or proximity sensors, audio sensors, and/or various other types of sensors. The various sensors 532 may capture data associated with an environment around the height adjustable trailer 510, such as imaging data, depth data, range or distance data, presence or proximity data, audio data, and/or other types of data. To this end, various sensors 532 may be positioned or oriented at various different portions or sections of the trailer 510 to capture data in the environment, e.g., substantially around an entire periphery of the trailer 510, as well as above and/or below portions of the trailer 510. Based at least in part on the captured data, the vehicle control system 530 may be configured to (semi-)autonomously control operations of the height adjustable trailer 510.

The one or more front wheels 534 may comprise casters, rollers, wheels, tires, and/or various other types of rollers or wheels to facilitate (semi-)autonomous movement of the height adjustable trailer 510, without attachment or coupling to a truck or tractor. In addition, the front wheels 534 may include brakes or related braking actuators or systems to selectively hold or prevent rotation of the front wheels 534. Further, the associated motors or actuators 536 may comprise various types of rotary actuators, linear actuators, hydraulic cylinders, or other types of motors or actuators configured to deploy, extend, and/or retract the front wheels 534 as desired.

In example embodiments, the front wheels 534 may have an adjustable height controlled by the actuators 536. In some examples, the front wheels 534 and actuators 536 may comprise extendible or telescoping members to extend and/or retract the front wheels 534. In additional examples, the front wheels 534 and actuators 536 may comprise linkages, parallel linkages, and/or other movable linkages to extend and/or retract the front wheels 534. In further examples, the front wheels 534 and actuators 536 may comprise cylinders, pistons, or other similar linear actuation mechanisms to extend and/or retract the front wheels 534. In still further examples, the front wheels 534 and actuators 536 may comprise various types of suspension systems, such as airbag-type suspension systems or other adjustable suspension systems to extend and/or retract the front wheels 534.

In further example embodiments, the front wheels 534 may comprise front height adjustment mechanisms similar to the height adjustment mechanisms described herein with respect to FIGS. 3-4B. For example, the front wheels 534 may comprise front drive wheels, front drive motors, front power supplies, front suspension linkages, and associated front locks, similar to corresponding components described herein at least with respect to FIGS. 3-4B. In such examples, the front suspension linkages may be formed or configured similar to leading arm suspension linkages, or trailing arm suspension linkages. The various components of the front height adjustment mechanisms may be configured and operated in substantially the same manner as described herein with respect to FIGS. 3-4B.

In example embodiments, during transport of the height adjustable trailer 510 by a coupled truck or tractor, the one or more drive wheels may provide assistive forces, e.g., motive forces or slowing/braking forces, to the operation of the truck or tractor. Such assistive operation by the drive motors and drive wheels of the height adjustable trailer 510 may increase safety, range, and/or efficiency of the coupled trailer 510 and truck or tractor. Further, during transport of the trailer 510, one or more height adjustment mechanisms of the trailer 510 may be operated or actuated to adjust a height and/or angle of the trailer 510 as desired, e.g., to improve aerodynamics, improve range or efficiency, to clear height restrictions or overhead obstacles, and/or to compensate for grades or angles associated with the ground. Moreover, the height and/or angle adjustment of the trailer 510 may be performed based on data captured by one or more sensors 532.

In additional example embodiments, prior to decoupling or detaching the height adjustable trailer 510 from a truck or tractor at a destination, e.g., a yard of a material handling facility, the front wheels 534 may be deployed and/or extended via the actuators 536 to maintain the trailer 510 in a stable position and orientation upon decoupling of the truck or tractor. The front wheels 534 may be deployed or extended to contact the ground, e.g., based on data from one or more sensors 532, and then, the truck or tractor may decouple from the trailer 510. Moreover, the deployment and/or extension of the front wheels 534 may be performed based on data captured by one or more sensors 532.

In addition, while decoupled from the truck or tractor, the height adjustable trailer 510 may operate one or more height adjustment mechanisms of the trailer 510 to adjust a height and/or angle of the trailer 510 as desired. Further, the height adjustable trailer 510 may move or travel to a different desired location, e.g., toward a dock, a processing station, a storage location, or other location associated with a yard of a material handling facility, using the drive wheels and/or front wheels. In some examples, the height adjustable trailer 510 may adjust height and/or angle to facilitate loading and/or unloading operations at a dock, to facilitate loading, unloading, or other operations at ground level, to facilitate storage operations, and/or to enable various other operations, including movement, loading, unloading, sortation, storage, or others. Moreover, the height or angle adjustment of the trailer 510 and the movement of the trailer 510 to facilitate various operations may be performed based on data captured by one or more sensors 532.

In example embodiments in which the front wheels 534 are selectively extendible and/or retractable, the height adjustment mechanism associated with the drive wheels of the trailer 510 may be actuated in cooperation with the actuators 536 of the front wheels 534 to effect desired heights and/or angles of the trailer 510. For example, at a dock in a yard of a material handling facility, the ground may be angled toward the dock to prevent rolling away of trailers. This may result in the floor of the cargo box of the trailer 510 being angled toward and into the facility or building at the dock, and may consequently cause rolling or movement of items or cargo toward or into the facility or building by the force of gravity. In order to prevent unintentional rolling or movement of items or cargo, the height adjustment mechanism associated with the drive wheels and the actuators 536 of the front wheels 534 may be actuated to adjust the angle of the trailer 510 to substantially match or correspond to the floor of the facility or building at the dock, thereby improving safety, ergonomics, and efficiency of operations at the dock.

Various other operations or processes may be commanded, instructed, or performed by the vehicle control system 530 of the (semi-)autonomous height adjustable trailer 510 described herein, based at least in part on data captured by one or more sensors 532. In further examples, the vehicle control system 530 may receive data related to various operations or processes via various communication devices from other data sources or sensors external to the trailer 510, e.g., from a control system of a material handling facility, from control systems of various trucks, tractors, or other vehicles, from control systems or communication devices utilized by facility personnel, and/or from various other sources.

Figure 6A:
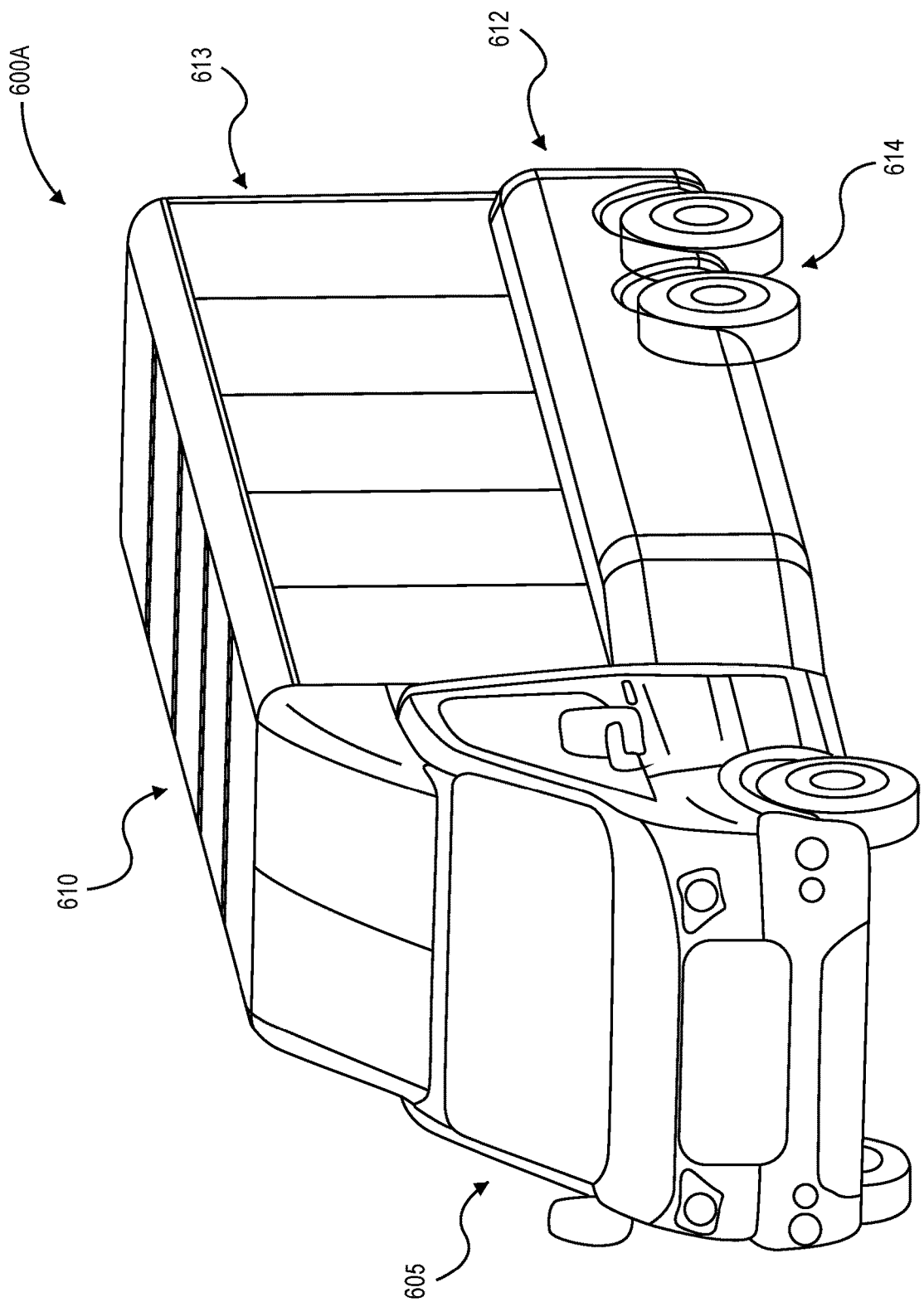
FIG. 6A is a schematic diagram of an example height adjustable truck, in accordance with implementations of the present disclosure.
Figure 6B:
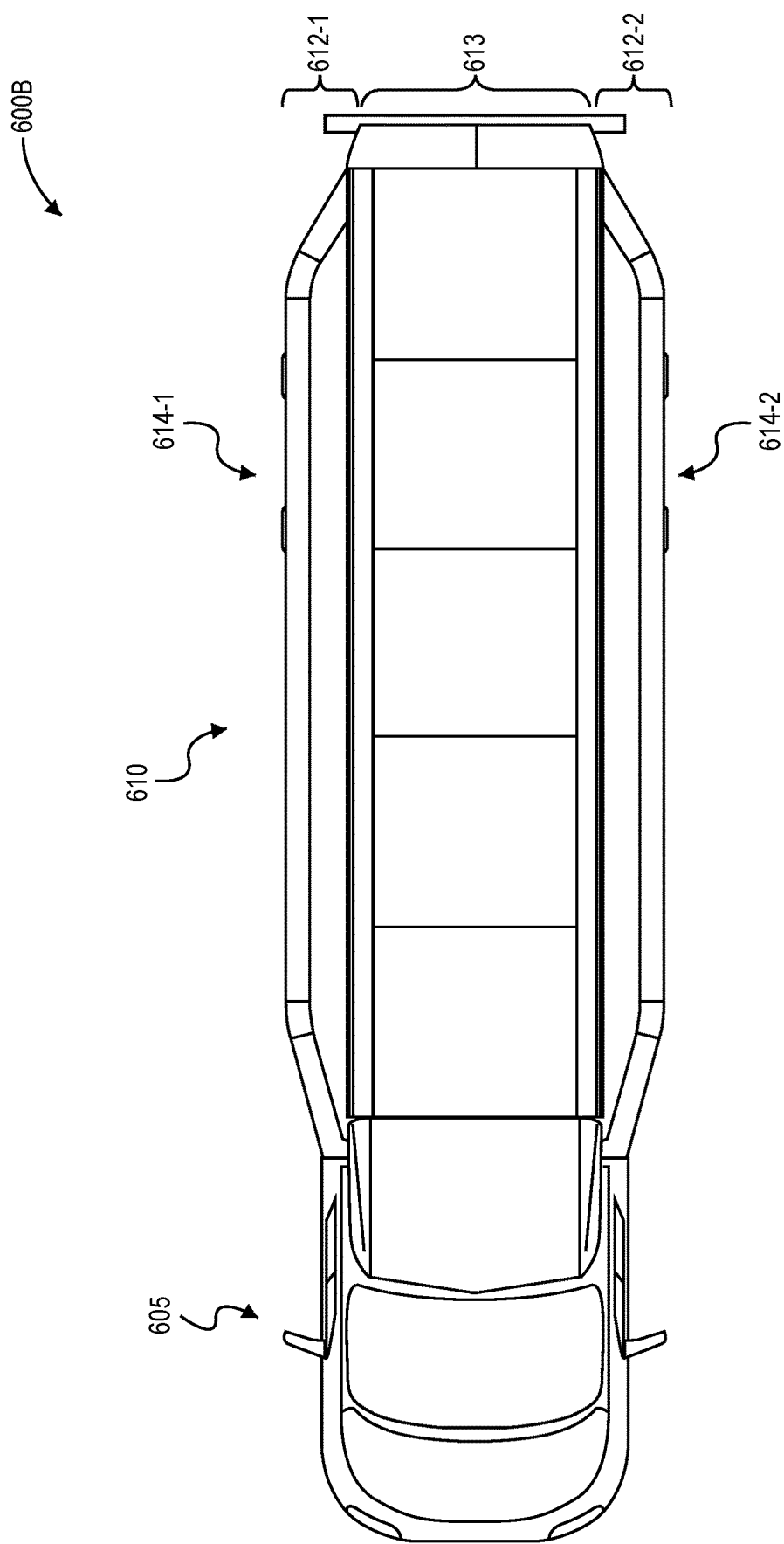
FIG. 6B is a schematic, top view diagram of an example height adjustable truck, in accordance with implementations of the present disclosure.

FIG. 6A is a schematic diagram 600A of an example height adjustable truck, in accordance with implementations of the present disclosure, and FIG. 6B is a schematic, top view diagram 600B of an example height adjustable truck, in accordance with implementations of the present disclosure.

As shown in FIGS. 6A and 6B, an example height adjustable trailer 610 may be relatively fixedly or permanently coupled to and transported by a truck or tractor 605. The height adjustable truck and trailer 605, 610 may comprise a chassis 612, a cargo box 613, and one or more drive wheels 614. Although FIGS. 6A and 6B illustrate multiple drive wheels 614 on each side of the chassis 612 and cargo box 613, some example embodiments may include only one drive wheel 614 on each side of the chassis 612 and cargo box 613.

In addition, as further shown in FIG. 6B, the chassis 612 may be formed of two portions or sections 612-1, 612-2 that are positioned on opposite, lateral sides of the cargo box 613. Further, each section 612-1, 612-2 of the chassis may include one or more respective drive wheels 614-1, 614-2 that are similarly positioned on opposite, lateral sides of the cargo box 613. Each drive wheel 614-1, 614-2 may include corresponding power supplies, drive motors, suspension linkages, and/or other components associated with respective height adjustment apparatus as further described herein at least with respect to FIGS. 3-4B.

By forming or configuring the two sections 612-1, 612-2 of the chassis on opposite, lateral sides of the cargo box 613, substantially no or only few portions of the chassis 612 or other structural components thereof may extend between opposing sections 612-1, 612-2. Generally, only the cargo box 613, connecting or coupling elements between the chassis sections 612-1, 612-2 and the cargo box 613, and/or portions of the suspension linkages and/or other components of the respective height adjustment apparatus may extend between the opposing sections 612-1, 612-2. As a result, the cargo box 613 may move, translate, slide, pivot, and/or rotate between and relative to the sections 612-1, 612-2 of the chassis. In this manner, the cargo box 613 may move between various desired heights and/or angles relative to the chassis sections 612-1, 612-2 as further described herein at least with respect to FIGS. 7A-7C.

Figure 7A:
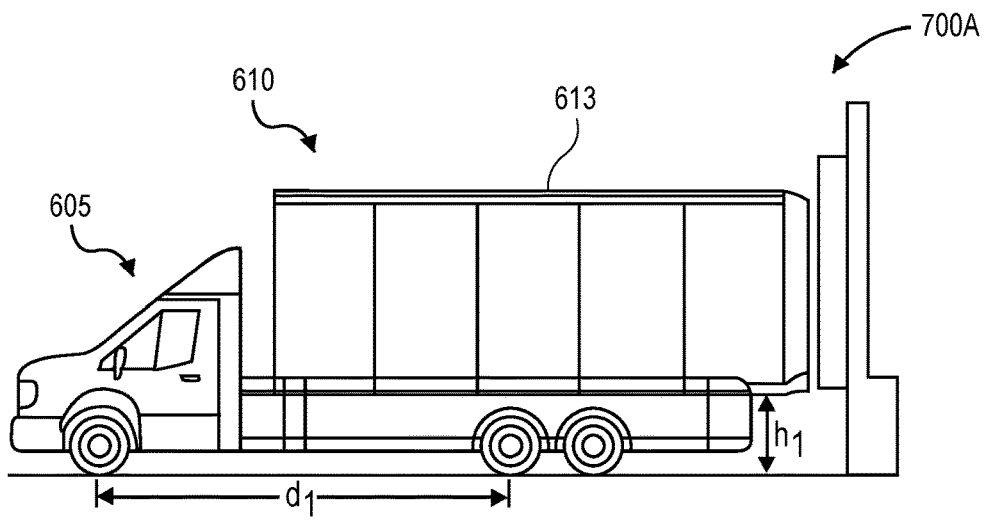
FIG. 7A is a schematic, side view diagram of an example height adjustable truck in a raised position, in accordance with implementations of the present disclosure.
Figure 7B:
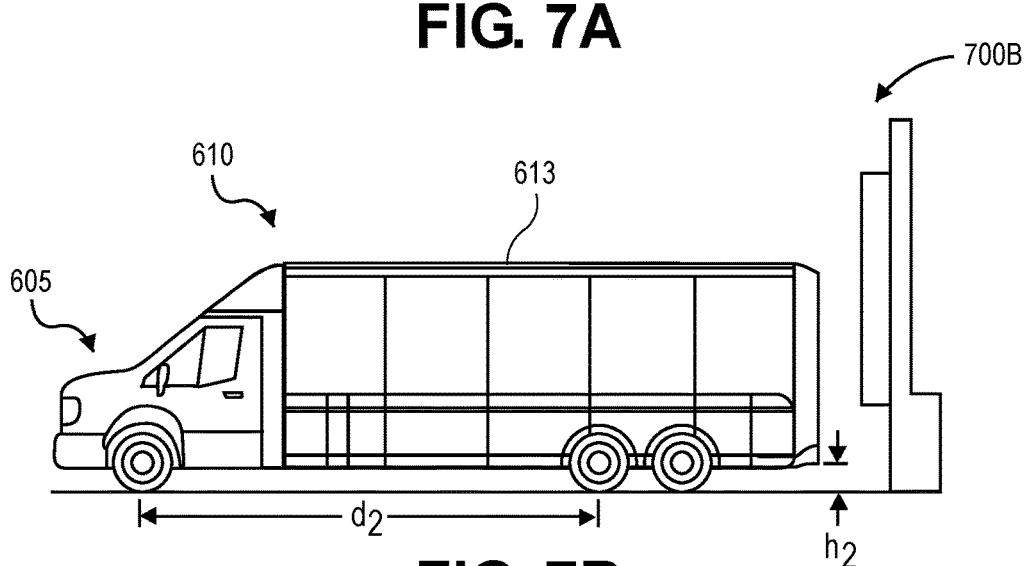
FIG. 7B is a schematic, side view diagram of an example height adjustable truck in a transport position, in accordance with implementations of the present disclosure.
Figure 7C:
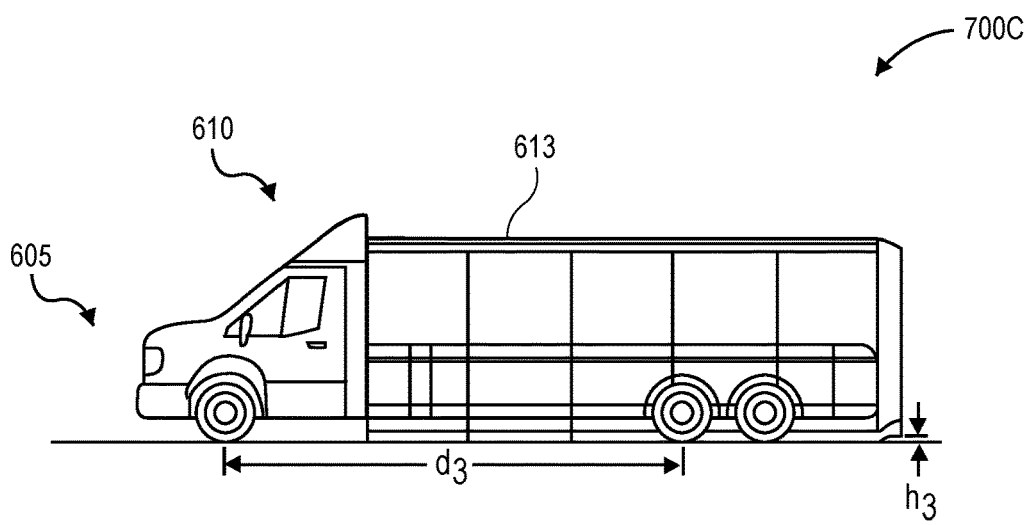
FIG. 7C is a schematic, side view diagram of an example height adjustable truck in a lowered position, in accordance with implementations of the present disclosure.

FIG. 7A is a schematic, side view diagram 700A of an example height adjustable truck in a raised position, in accordance with implementations of the present disclosure, FIG. 7B is a schematic, side view diagram 700B of an example height adjustable truck in a transport position, in accordance with implementations of the present disclosure, and FIG. 7C is a schematic, side view diagram 700C of an example height adjustable truck in a lowered position, in accordance with implementations of the present disclosure.

The example height adjustable truck and trailer 605, 610 illustrated in FIGS. 7A-7C may include any and all of the features of the height adjustable trailer 610 described herein at least with respect to FIGS. 6A and 6B.

As shown in FIG. 7A, the cargo box 613 of the truck and trailer 605, 610 may be at a first, raised height relative to the chassis and other portions of the truck and trailer 605, 610, e.g., for loading and/or unloading operations. By operating the height adjustment apparatus associated with the drive wheel, the cargo box 613 may move to the raised height $h_1$ relative to the ground. For example, the raised height $h_1$ may be associated with a height of a dock or other platform for loading and/or unloading cargo to and/or from the cargo box 613. Further, the operation of the height adjustment apparatus to move the cargo box 613 to the raised height $h_1$ may also cause adjustment to the wheelbase of the truck and trailer 605, 610. In the example of FIG. 7A, raising the cargo box 613 to the raised height $h_1$ may cause corresponding shortening of the wheelbase to the shortened wheelbase $d_1$, which may be measured between front and rear wheels of the truck and trailer 605, 610 in this example embodiment.

As shown in FIG. 7B, the cargo box 613 of the truck and trailer 605, 610 may be at a second, nominal height relative to the chassis and other portions of the truck and trailer 605, 610, e.g., for transport operations. By operating the height adjustment apparatus associated with the drive wheel, the cargo box 613 may move to the nominal height $h_2$ relative to the ground. For example, the nominal height $h_2$ may be associated with a transport or drive height for the cargo box 613. Further, the operation of the height adjustment apparatus to move the cargo box 613 to the nominal height $h_2$ may also cause adjustment to the wheelbase of the truck and trailer 605, 610. In the example of FIG. 7B, moving the cargo box 613 to the nominal height $h_2$ may adjust the wheelbase to the nominal wheelbase $d_2$ that is greater than the shortened wheelbase $d_1$, which may be measured between front and rear wheels of the truck and trailer 605, 610 in this example embodiment.

The nominal height $h_2$ of the cargo box 613, as compared to the raised height $h_1$ shown in FIG. 7A, may generally reduce a frontal area of the cargo box 613 and also lower a ride height of the cargo box 613. These changes may consequently reduce the drag and improve aerodynamics associated with the cargo box 613 and truck and trailer 605, 610 as a whole, thereby potentially increasing range and/or efficiency of the truck and trailer 605, 610 during transport.

As shown in FIG. 7C, the cargo box 613 of the truck and trailer 605, 610 may be at a third, lowered height relative to the chassis and other portions of the truck and trailer 605, 610, e.g., for ground-based operations. By operating the height adjustment apparatus associated with the drive wheel, the cargo box 613 may move to the lowered height $h_3$ that is lower than each of the raised height $h_1$ and the nominal height $h_2$. For example, the lowered height $h_3$ may be substantially at ground level for various ground-based operations, such as loading and/or unloading cargo to and/or from the cargo box 613 for delivery. Further, the operation of the height adjustment apparatus to move the cargo box 613 to the lowered height $h_3$ may also cause adjustment to the wheelbase of the truck and trailer 605, 610. In the example of FIG. 7C, lowering the cargo box 613 to the lowered height $h_3$ may cause corresponding lengthening of the wheelbase to the lengthened wheelbase $d_3$ that is greater than the nominal wheelbase $d_2$ and the shortened wheelbase $d_1$, which may be measured between front and rear wheels of the truck and trailer 605, 610 in this example embodiment.

In some example embodiments, the cargo box 613 of the truck and trailer 605, 610 may be moved, via the height adjustment apparatus, to various other desired heights other than those illustrated in FIGS. 7A-7C. In addition, the various desired heights may be associated with various types of operations and/or different locations, e.g., for movement, transport, storage, loading, unloading, sortation, and/or various other operations. By adjusting the height of the cargo box 613 to various desired heights, the safety, ergonomics, speed, and/or efficiency of various operations may be improved.

In alternative example embodiments, the different heights of the cargo box 613 may correspond to different wheelbases of the truck and trailer 605, 610. For example, dependent upon the particular configuration or arrangement of components of the height adjustment apparatus described herein, a raised height of the cargo box 613 may correspond to a lengthened wheelbase, and a lowered height of the cargo box 613 may correspond to a shortened wheelbase. Various other combinations of different heights of the cargo box 613 and different wheelbases of the truck and trailer 605, 610 are also possible based on the particular configuration or arrangement of components of the height adjustment apparatus.

Moreover, in further example embodiments described herein, the cargo box 613 of the truck and trailer 605, 610 may also be angled or tilted at various different desired heights to facilitate performance of various operations. For example, during some stages of transport, tilting or angling of the cargo box 613 may improve safety, speed, and/or efficiency of transport of the truck and trailer 605, 610, e.g., while traveling along roadways with certain angles or grades, and/or to clear various height restrictions or overhead obstacles. In addition, during various loading, unloading, and/or other operations associated with cargo within the cargo box 613, tilting or angling of the cargo box 613 may improve safety, ergonomics, speed, and/or efficiency of various material handling tasks, e.g., to accommodate or compensate for angles or grades associated with the ground, and/or to match or correspond to angles or grades of surfaces or floors associated with docks or material handling facilities.

Figure 8:
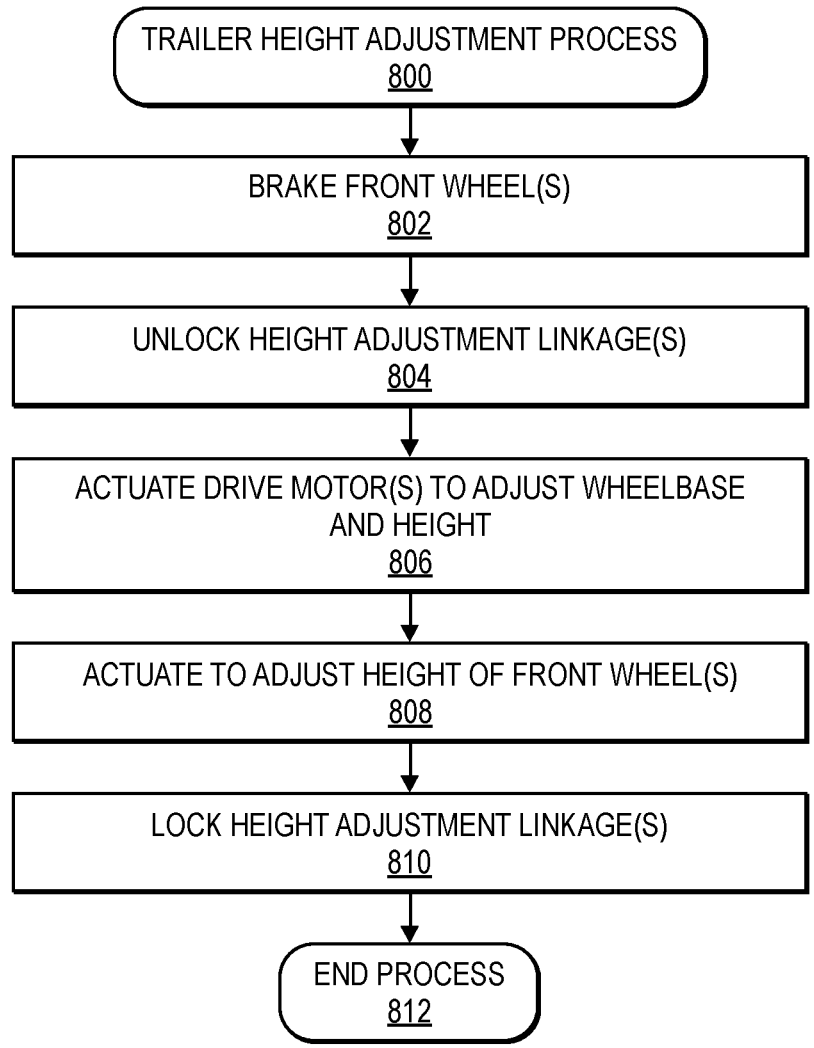
FIG. 8 is a flow diagram illustrating an example trailer height adjustment process, in accordance with implementations of the present disclosure.

FIG. 8 is a flow diagram illustrating an example trailer height adjustment process 800, in accordance with implementations of the present disclosure.

The process 800 may begin by braking front wheel(s), as at 802. For example, front wheels of a trailer, and/or front wheels of a coupled truck and trailer, may be braked in order to prevent movement or travel of the truck and/or trailer during height adjustment. Various braking mechanisms or systems may be associated with the front wheels, such as disc brakes, drum brakes, electronic brakes, or other types of brakes. Further, a control system may command or instruct braking of the front wheels. In some examples, the truck/tractor can operate in reverse while the drive wheels brake or drive forward.

In some example embodiments in which the front wheels include front height adjustment mechanisms similar to the height adjustment mechanisms associated with drive wheels of a truck and/or trailer, the front wheels may not be braked. In such examples, the front wheels may be actuated to move or rotate toward the drive wheels, together with movement or rotation of the drive wheels toward the front wheels, in order to adjust height and/or angle of the truck and/or trailer, as further described herein.

The process 800 may continue by unlocking height adjustment linkage(s), as at 804. For example, one or more lock mechanisms associated with the suspension linkages that are pivotably coupled to the drive motors may be unlocked. Such unlocking may permit movement or rotation of the suspension linkages relative to the drive motors, thereby adjusting a height and/or angle of the truck and/or trailer. Further, a control system may command or instruct unlocking of one or more height adjustment linkages.

In some example embodiments in which the front wheels include front height adjustment mechanisms similar to the height adjustment mechanisms associated with drive wheels of a truck and/or trailer, one or more lock mechanisms associated with front suspension linkages that are pivotably coupled to front drive motors may also be unlocked. Such unlocking may permit movement or rotation of the front suspension linkages relative to the front drive motors, thereby further adjusting a height and/or angle of the truck and/or trailer.

The process 800 may proceed by actuating drive motor(s) to adjust wheelbase and height, as at 806. For example, after unlocking the lock mechanisms associated with the suspension linkages, the drive motors may be actuated or driven to rotate the drive wheels and cause movement of the drive wheels toward a front or rear of the truck and/or trailer. Due to the movement or rotation of the suspension linkages relative to the drive motors, the movement of the drive wheels may cause a shortening or lengthening of a wheelbase of the truck and/or trailer, and may also substantially simultaneously cause adjustment to a height and/or angle of at least one of the chassis or cargo box of the truck and/or trailer. Further, a control system may command or instruct actuating the drive motors to adjust wheelbase and height.

In some example embodiments in which the front wheels include front height adjustment mechanisms similar to the height adjustment mechanisms associated with drive wheels of a truck and/or trailer, the front drive motors may also be actuated or driven to rotate the front drive wheels and cause movement of the front drive wheels toward a front or rear of the truck and/or trailer. Similarly, due to the movement or rotation of the front suspension linkages relative to the front drive motors, the movement of the front drive wheels may cause a shortening or lengthening of a wheelbase of the truck and/or trailer, and may also substantially simultaneously cause adjustment to a height and/or angle of at least one of the chassis or cargo box of the truck and/or trailer.

The process 800 may then continue to actuate to adjust a height of the front wheels, as at 808. In some example embodiments, the front wheels may include various types of actuators or mechanisms to cause extension or retraction of the front wheels, thereby adjusting a height of the front wheels. As described herein, the actuators or mechanisms may comprise telescoping actuators and mechanisms, various linkages and actuators, linear actuators or cylinders, airbag suspension systems, or other types of extension and retraction mechanisms. Such adjustment to the extension or retraction of the front wheels, in combination with the change or adjustment to the wheelbase and height via the height adjustment mechanisms of the drive wheels, may cause adjustment to an overall height and/or angle of at least one of the chassis or cargo box of the truck and/or trailer. Further, a control system may command or instruct actuating to adjust the height of the front wheels.

The process 800 may proceed to lock the height adjustment linkage(s), as at 810. For example, one or more lock mechanisms associated with the suspension linkages that are pivotably coupled to the drive motors may be locked to maintain the adjusted height and/or angle of the chassis and/or cargo box of the truck and/or trailer, as well as to maintain the adjusted wheelbase. Such locking may prevent movement or rotation of the suspension linkages relative to the drive motors, thereby securing a current height and/or angle of the chassis and/or cargo box. Further, a control system may command or instruct locking of one or more height adjustment linkages.

In some example embodiments in which the front wheels include front height adjustment mechanisms similar to the height adjustment mechanisms associated with drive wheels of a truck and/or trailer, one or more lock mechanisms associated with front suspension linkages that are pivotably coupled to front drive motors may also be locked. Such locking may similarly prevent movement or rotation of the front suspension linkages relative to the front drive motors, thereby further securing a current height and/or angle of the chassis and/or cargo box.

The process 800 may then end, as at 812.

Figure 9:
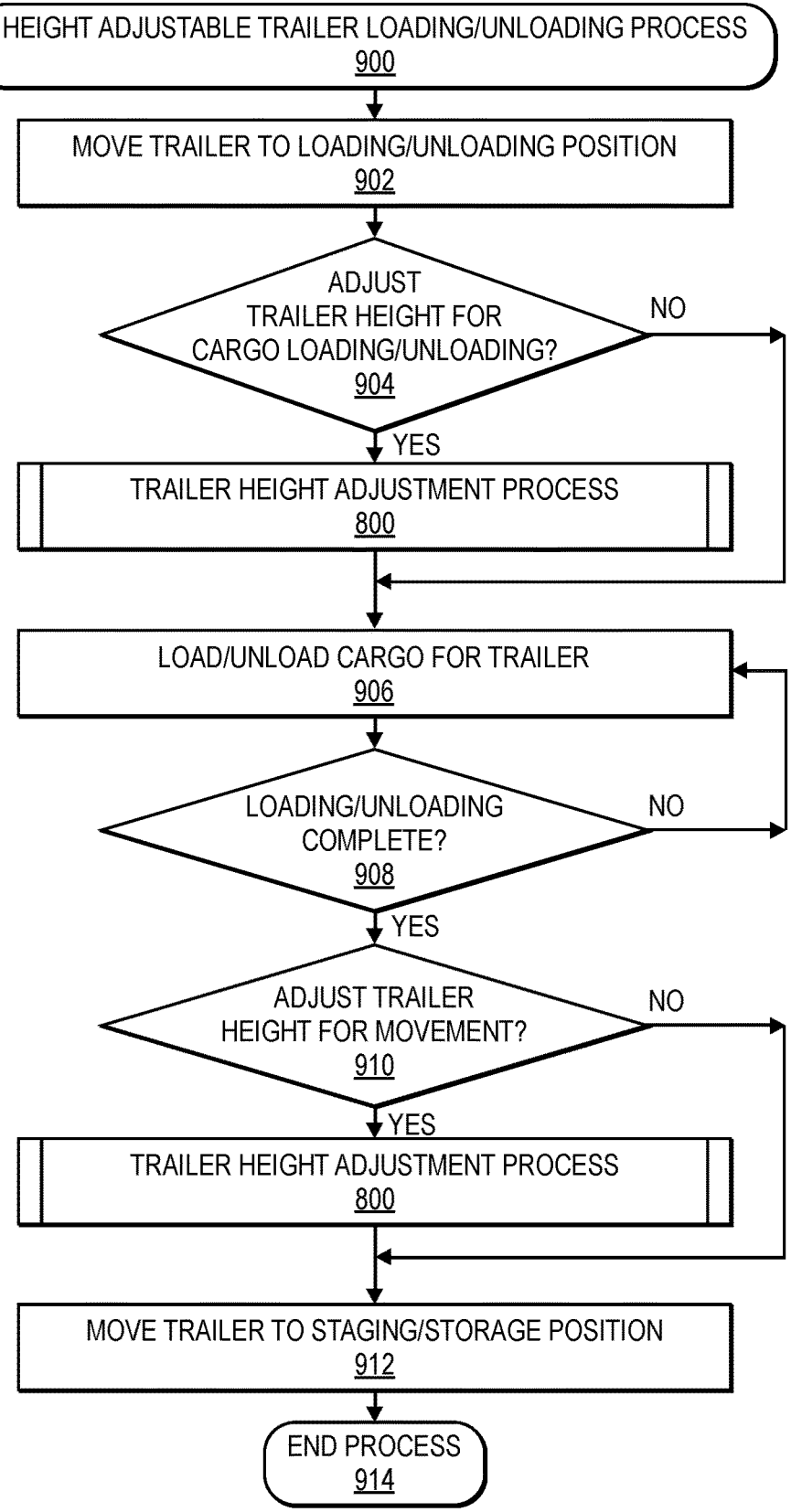
FIG. 9 is a flow diagram illustrating an example height adjustable trailer loading/unloading process, in accordance with implementations of the present disclosure.

FIG. 9 is a flow diagram illustrating an example height adjustable trailer loading/unloading process 900, in accordance with implementations of the present disclosure.

The process 900 may begin by moving a trailer to a loading/unloading position, as at 902. For example, a truck or tractor may be coupled or attached to the trailer, and the truck or tractor, e.g., by operation of a driver, may move or reposition the trailer at a loading/unloading position. Example loading/unloading positions may include a dock of a facility or warehouse, a raised platform, a portion of a building, substantially ground level in a yard or parking lot, or various other positions or locations. Further, a control system may command or instruct movement of the trailer to a loading/unloading position.

The process 900 may continue by determining whether to adjust a trailer height for cargo loading/unloading, as at 904. For example, a current height of the trailer, e.g., a cargo box, may be determined or known. In addition, a height associated with the loading/unloading position may be determined or received. In some examples, one or more sensors may detect portions of a loading/unloading position in order to determine an associated height. In other examples, the height associated with the loading/unloading position may be received from various other control systems, communication devices, or other data sources. The various heights and/or angles associated with a loading/unloading position may include heights and/or angles associated with a dock of a facility or warehouse, a raised platform, a portion of a building, substantially ground level in a yard or parking lot, or other heights and/or angles associated with various other positions or locations. Then, the current height of the trailer may be compared with a height associated with the loading/unloading position, e.g., the desired height, in order to determine whether to adjust the trailer height. Further, a control system may command or instruct determination of whether to adjust a trailer height.

If it is determined to adjust the trailer height, e.g., because the current height does not match the desired height, the process 900 may proceed to the trailer height adjustment process, as described in the process 800 of FIG. 8.

If, however, it is determined not to adjust the trailer height, e.g., because the current height substantially matches the desired height, and/or after completing the trailer height adjustment process 800, the process 900 may proceed by loading/unloading cargo for the trailer as 906. For example, various items, products, goods, materials, or other cargo may be loaded into and/or unloaded from the cargo box of the trailer as desired, via various manual, semi-automated, and/or automated machines, devices, vehicles, robots, and/or processes. Because the height and/or angle of the cargo box of the trailer may be adjusted to substantially match a height and/or angle associated with the loading/unloading position, safety, speed, ergonomics, and/or efficiency of various loading/unloading operations may be improved. Further, a control system may command or instruct loading/unloading of cargo for the trailer.

The process 900 may then continue to determine whether the loading/unloading is complete, as at 908. For example, it may be determined whether the various items, products, or other cargo have been successfully loaded and/or unloaded for the trailer at the loading/unloading position. Further, a control system may determine whether the loading/unload- ing is complete. If it is determined that the loading/unloading is not yet complete, the process 900 may return to step 906 to continue the loading/unloading operations.

If, however, it is determined that the loading/unloading is complete, the process 900 may proceed to determine whether to adjust a trailer height for movement, as at 910. For example, a current height of the trailer, e.g., a cargo box, may be determined or known. In addition, a height associated with movement of the trailer may be determined or received. In some examples, one or more sensors may detect portions of an environment around the trailer in order to determine a desired height. In other examples, the height associated with movement of the trailer may be received from various other control systems, communication devices, or other data sources. The various heights and/or angles associated with movement of the trailer may be based on heights and/or angles associated with portions of a surface or ground on which the trailer is moving, portions of overhead obstacles or height restrictions, and/or various other portions of an environment around the trailer during movement. Then, the current height of the trailer may be compared with a height associated with movement, e.g., the desired height, in order to determine whether to adjust the trailer height. Further, a control system may command or instruct determination of whether to adjust a trailer height.

If it is determined to adjust the trailer height, e.g., because the current height does not match the desired height, the process 900 may proceed to the trailer height adjustment process, as described in the process 800 of FIG. 8.

If, however, it is determined not to adjust the trailer height, e.g., because the current height substantially matches the desired height, and/or after completing the trailer height adjustment process 800, the process 900 may continue with moving the trailer to a staging/storage position, as 912. For example, the trailer may be moved, e.g., by operation of a driver of a coupled truck or tractor, to a staging/storage position for later movement, retrieval, transport, or other operations. In addition, the trailer may be moved to couple or attach to another truck or tractor and/or to be transported to a destination location, such as another facility, a delivery location, or various other locations. Because the height and/or angle of the cargo box of the trailer may be adjusted to substantially match a desired height and/or angle associated with movement of the trailer, safety, speed, and/or efficiency of various movement operations may be improved. Further, a control system may command or instruct movement of the trailer.

The process 900 may then end, as 914.

Figure 10:
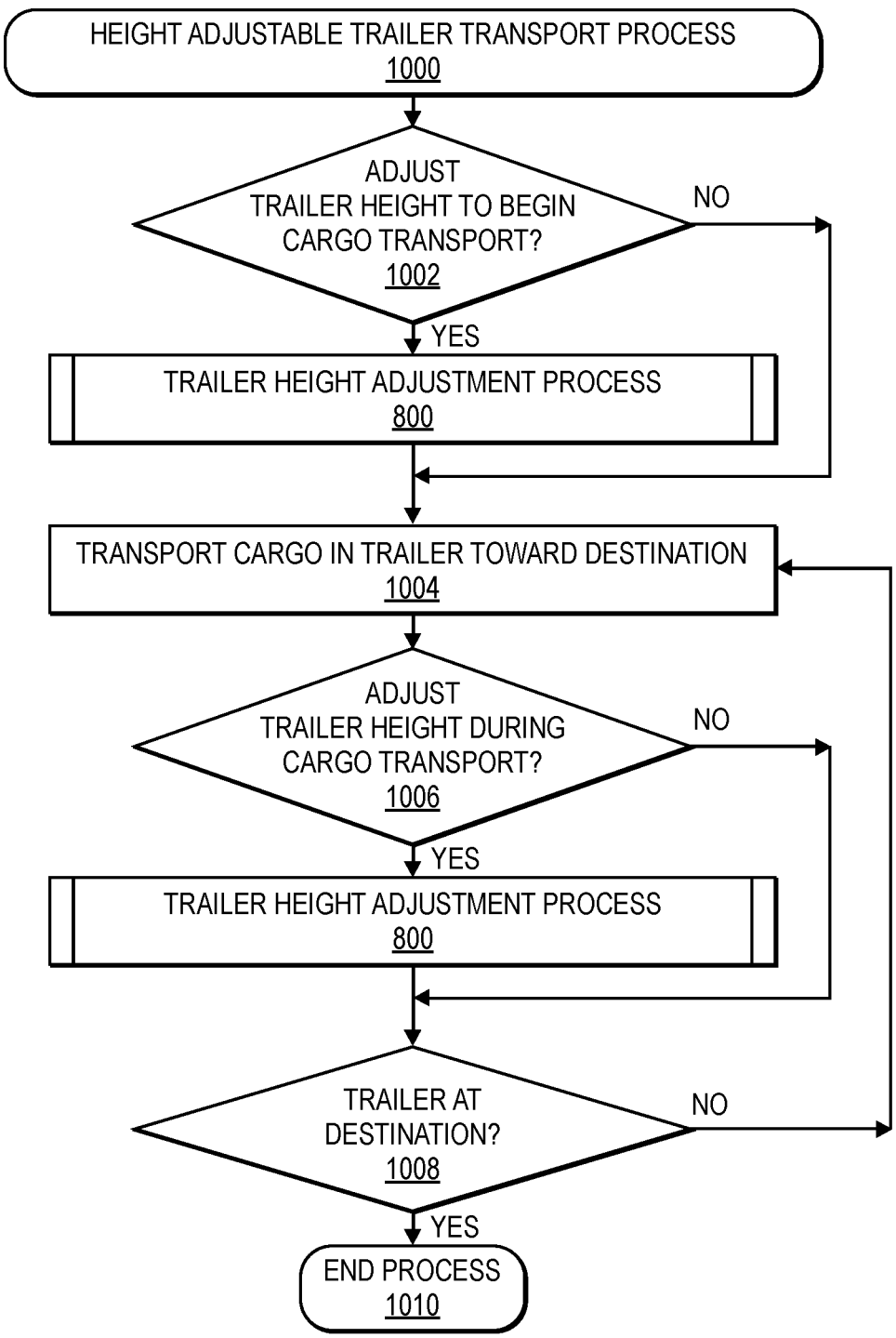
FIG. 10 is a flow diagram illustrating an example height adjustable trailer transport process, in accordance with implementations of the present disclosure.

FIG. 10 is a flow diagram illustrating an example height adjustable trailer transport process 1000, in accordance with implementations of the present disclosure.

The process 1000 may begin by determining whether to adjust a trailer height to begin cargo transport, as at 1002. For example, a current height of the trailer, e.g., a cargo box, may be determined or known. In addition, a height associated with transport of the trailer may be determined or received. In some examples, one or more sensors may detect portions of an environment around the trailer in order to determine a desired height. In other examples, the height associated with transport of the trailer may be received from various other control systems, communication devices, or other data sources. The various heights and/or angles associated with transport of the trailer may be based on heights and/or angles associated with portions of a surface or ground on which the trailer is traveling, portions of overhead obstacles or height restrictions, and/or various other portions of an environment around the trailer during transport. Then, the current height of the trailer may be compared with a height associated with transport, e.g., the desired height, in order to determine whether to adjust the trailer height. Further, a control system may command or instruct determination of whether to adjust a trailer height.

If it is determined to adjust the trailer height, e.g., because the current height does not match the desired height, the process 1000 may proceed to the trailer height adjustment process, as described in the process 800 of FIG. 8.

If, however, it is determined not to adjust the trailer height, e.g., because the current height substantially matches the desired height, and/or after completing the trailer height adjustment process 800, the process 1000 may continue by transporting cargo in the trailer toward a destination, as 1004. For example, the trailer may be coupled or attached to a truck or tractor and may be transported, e.g., by operation of a driver, to a destination location, such as another facility, a delivery location, or various other locations. Because the height and/or angle of the cargo box of the trailer may be adjusted to substantially match a desired height and/or angle associated with transport of the trailer, safety, speed, and/or efficiency of various transport operations may be improved. Further, a control system may command or instruct transport of cargo in the trailer.

The process 1000 may proceed by determining whether to adjust a trailer height during cargo transport, as at 1006. For example, a current height of the trailer, e.g., a cargo box, may be determined or known. In addition, a height associated with continuing transport of the trailer may be determined or received. In some examples, one or more sensors may detect portions of an environment around the trailer in order to determine a desired height. In other examples, the height associated with continuing transport of the trailer may be received from various other control systems, communication devices, or other data sources. The various heights and/or angles associated with continuing transport of the trailer may be based on heights and/or angles associated with portions of a surface or ground on which the trailer is traveling, portions of overhead obstacles or height restrictions, and/or various other portions of an environment around the trailer during transport. Then, the current height of the trailer may be compared with a height associated with continuing transport, e.g., the desired height, in order to determine whether to adjust the trailer height. Further, a control system may command or instruct determination of whether to adjust a trailer height.

If it is determined to adjust the trailer height, e.g., because the current height does not match the desired height, the process 1000 may proceed to the trailer height adjustment process, as described in the process 800 of FIG. 8. Because the height and/or angle of the cargo box of the trailer may be adjusted to substantially match a desired height and/or angle associated with continuing transport of the trailer, safety, speed, and/or efficiency of various movement operations may be improved.

If, however, it is determined not to adjust the trailer height, e.g., because the current height substantially matches the desired height, and/or after completing the trailer height adjustment process 800, the process 1000 may continue to determine whether the trailer is at the destination, as at 1008. For example, it may be determined whether the trailer has arrived at the destination location. In some examples, a current position of the trailer may be determined based on global positioning system (GPS) data, satellite data, or other similar data. In other examples, a current position of the trailer may be determined based on data provided by a driver of a truck or tractor, personnel associated with a destination location, and/or various other control systems, communication devices, or other data sources. Further, a control system may command or instruct determination of whether the trailer has arrived at the destination.

If it is determined that the trailer has not arrived at the destination, the process 1000 may return to step 1004 to continue transporting cargo in the trailer toward the destination. Further, a control system may command or instruct continuing transport of cargo in the trailer.

If, however, it is determined that the trailer has arrived at the destination, the process 1000 may then end, as at 1010.

Figure 11A:
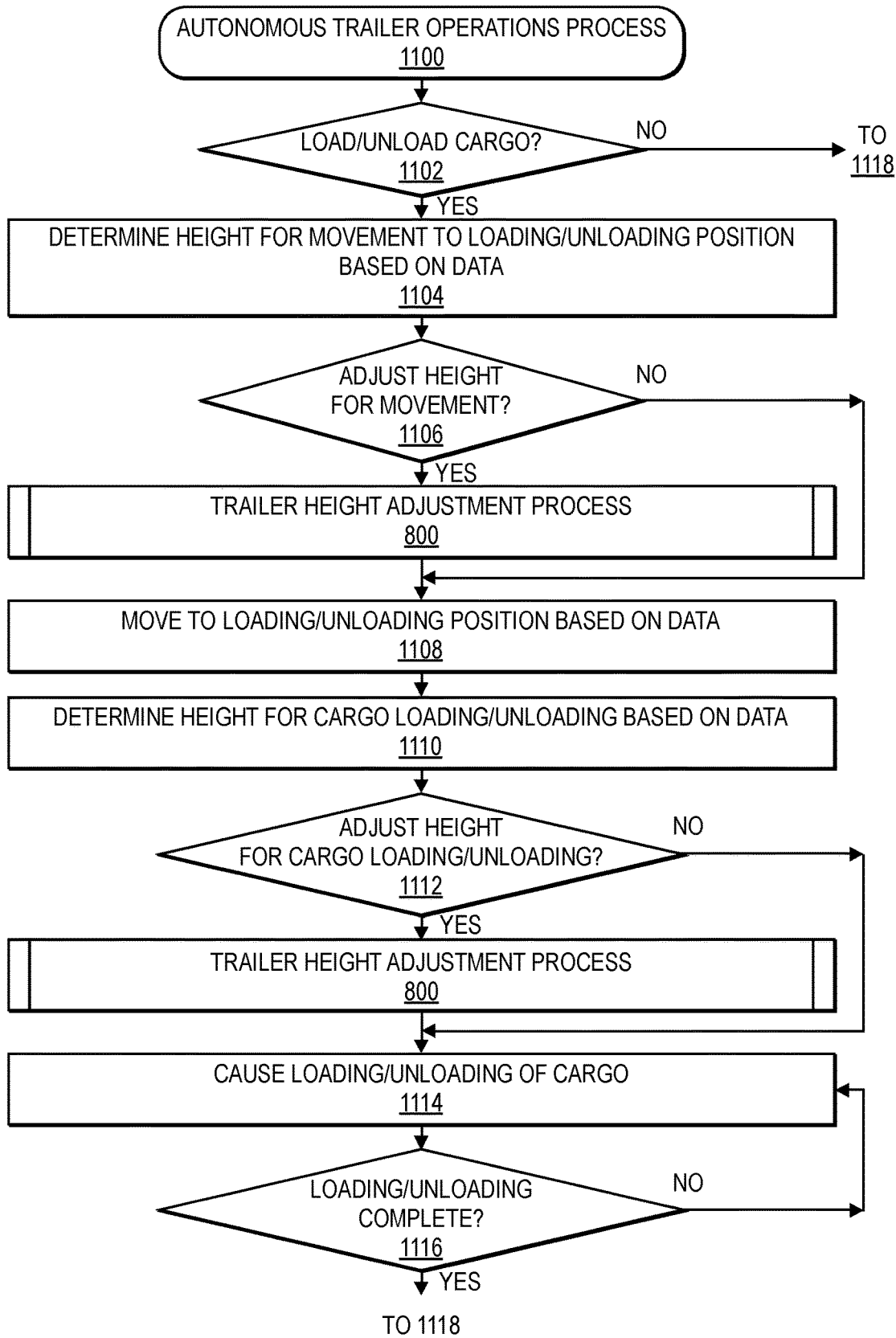
FIGS. 11A-11B is a flow diagram illustrating an example autonomous trailer operations process, in accordance with implementations of the present disclosure.
Figure 11B:
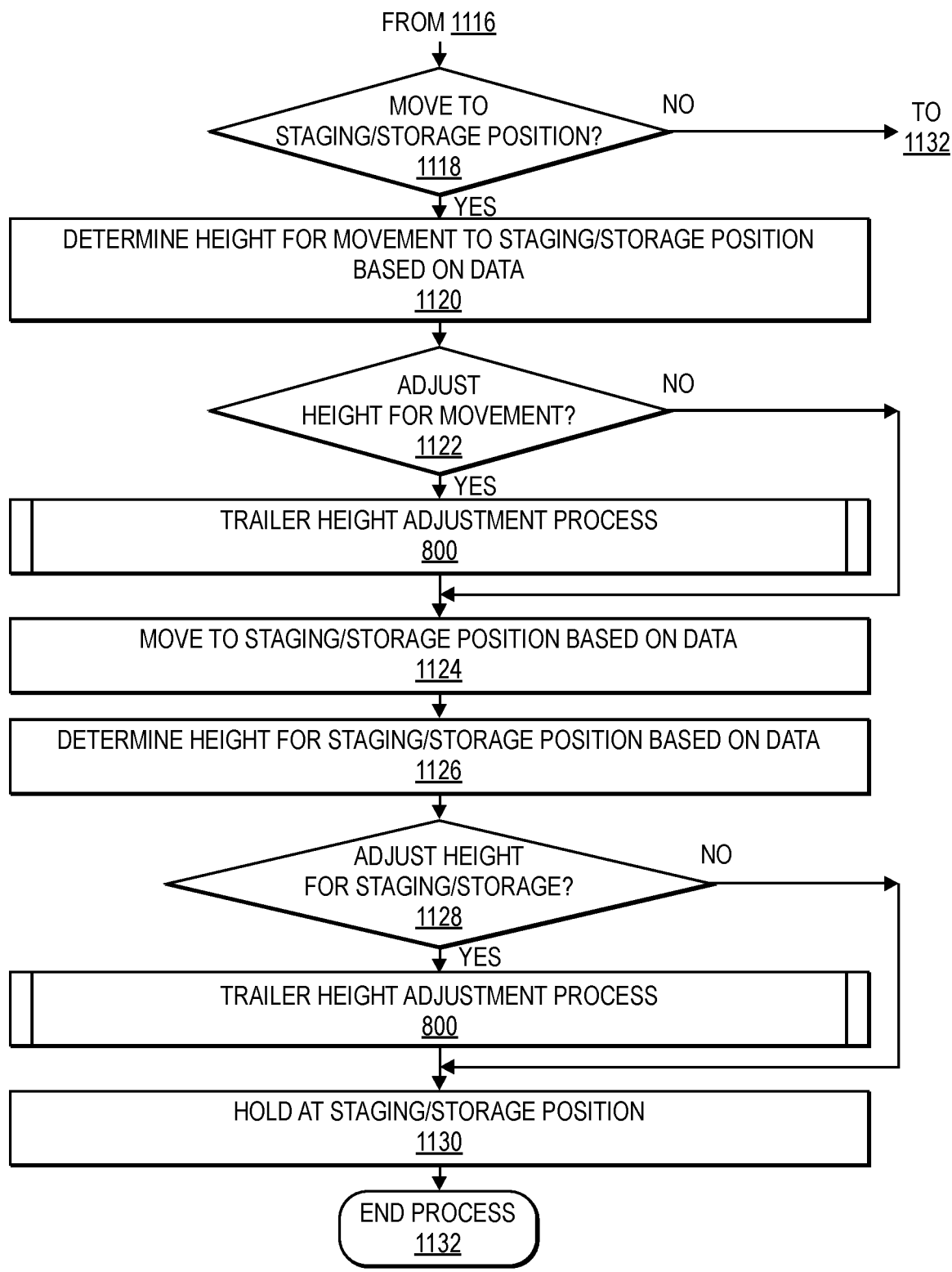

FIGS. 11A-11B is a flow diagram illustrating an example autonomous trailer operations process 1100, in accordance with implementations of the present disclosure.

The process 1100 may begin by determining whether to load/unload cargo, as at 1102. For example, it may be determined whether a (semi-)autonomous trailer is to be utilized to load/unload cargo at a loading/unloading position, e.g., associated with a yard of a facility. Further, a control system may command or instruct determination of whether to load and/or unload cargo for a (semi-)autonomous trailer.

If it is determined that cargo is to be loaded/unloaded for the (semi-)autonomous trailer, the process 1100 may continue by determining a height for movement to the loading/unloading position based on data, as at 1104. Various data may be captured by sensors onboard the (semi-)autonomous trailer to assist in height determination, and/or various data may be received from various control systems, communication devices, or other data sources to assist in height determination. The various data may be associated with a starting position, a current position, a destination position, surfaces or obstacles along a pathway and/or within the environment, grades or angles of surfaces, and/or other data. Further, a control system may command or instruct determination of a height for movement of the (semi-)autonomous trailer.

The process 1100 may proceed by determining whether to adjust height for movement, as at 1106. For example, a current height of the (semi-)autonomous trailer, e.g., a cargo box, may be determined or known. Then, the current height of the trailer may be compared with the determined height for movement, e.g., the desired height, in order to determine whether to adjust the height of the (semi-)autonomous trailer. Further, a control system may command or instruct determination of whether to adjust a height of the (semi-) autonomous trailer.

If it is determined to adjust the height of the (semi-) autonomous trailer, e.g., because the current height does not match the desired height, the process 1100 may proceed to the trailer height adjustment process, as described in the process 800 of FIG. 8.

If, however, it is determined not to adjust the height of the (semi-)autonomous trailer, e.g., because the current height substantially matches the desired height, and/or after completing the trailer height adjustment process 800, the process 1100 may continue to move the trailer to the loading/unloading position based on data, as at 1108. Various data may be captured by sensors onboard the (semi-)autonomous trailer to assist in movement to the loading/unloading position, and/or various data may be received from various control systems, communication devices, or other data sources to assist in height determination. The various data may be associated with a starting position, a current position, a destination position, surfaces or obstacles along a pathway and/or within the environment, grades or angles of surfaces, and/or other data. Because the height and/or angle of the cargo box of the (semi-)autonomous trailer may be adjusted to substantially match a desired height and/or angle associated with movement, safety, speed, and/or efficiency of various movement operations may be improved. Further, a control system may command or instruct movement of the (semi-)autonomous trailer.

The process 1100 may proceed to determine a height for cargo loading/unloading based on data, as at 1110. Various data may be captured by sensors onboard the (semi-)autonomous trailer to assist in height determination, and/or various data may be received from various control systems, communication devices, or other data sources to assist in height determination. The various data may be associated with a loading/unloading position, surfaces or obstacles at the loading/unloading position and/or within the environment, grades or angles of surfaces, and/or other data. Further, a control system may command or instruct determination of a height for cargo loading/unloading of the (semi-)autonomous trailer.

The process 1100 may then continue with determining whether to adjust height for cargo loading/unloading, as at 1112. For example, a current height of the (semi-)autonomous trailer, e.g., a cargo box, may be determined or known. Then, the current height of the trailer may be compared with the determined height for cargo loading/unloading, e.g., the desired height, in order to determine whether to adjust the height of the (semi-)autonomous trailer. Further, a control system may command or instruct determination of whether to adjust a height of the (semi-)autonomous trailer.

If it is determined to adjust the height of the (semi-) autonomous trailer, e.g., because the current height does not match the desired height, the process 1100 may proceed to the trailer height adjustment process, as described in the process 800 of FIG. 8.

If, however, it is determined not to adjust the height of the (semi-)autonomous trailer, e.g., because the current height substantially matches the desired height, and/or after completing the trailer height adjustment process 800, the process 1100 may proceed with causing loading/unloading of cargo for the (semi-)autonomous trailer at the loading/unloading position, as at 1114. For example, various items, products, goods, materials, or other cargo may be loaded into and/or unloaded from the cargo box of the (semi-)autonomous trailer as desired, via various manual, semi-automated, and/or automated machines, devices, vehicles, robots, and/or processes. Because the height and/or angle of the cargo box of the (semi-)autonomous trailer may be adjusted to substantially match a height and/or angle associated with the loading/unloading position, safety, speed, ergonomics, and/or efficiency of various loading/unloading operations may be improved. Further, a control system may command or instruct loading/unloading of cargo for the (semi-)autonomous trailer.

The process 1100 may then continue by determining whether the loading/unloading is complete, as at 1116. For example, it may be determined whether the various items, products, or other cargo have been successfully loaded and/or unloaded for the (semi-)autonomous trailer at the loading/unloading position. Further, a control system may determine whether the loading/unloading is complete. If it is determined that the loading/unloading is not yet complete, the process 1100 may return to step 1114 to continue the loading/unloading operations.

If, however, it is determined that the loading/unloading is complete, and/or if it is determined at step 1102 that cargo is not to be loaded/unloaded for the trailer, the process 1100 may proceed by determining whether to move to a staging/storage position, as at 1118. For example, it may be determined whether a (semi-)autonomous trailer is to be moved to a staging/storage position, e.g., associated with a yard of a facility. Further, a control system may command or instruct determination of whether to move a (semi-)autonomous trailer to a staging/storage position.

If it is determined that the (semi-)autonomous trailer is to be moved to a staging/storage position, the process 1100 may continue to determine a height for movement to the staging/storage position based on data, as at 1120. Various data may be captured by sensors onboard the (semi-)autonomous trailer to assist in height determination, and/or various data may be received from various control systems, communication devices, or other data sources to assist in height determination. The various data may be associated with a starting position, a current position, a destination position, surfaces or obstacles along a pathway and/or within the environment, grades or angles of surfaces, and/or other data. Further, a control system may command or instruct determination of a height for movement of the (semi-)autonomous trailer.

The process 1100 may proceed to determine whether to adjust height for movement, as at 1122. For example, a current height of the (semi-)autonomous trailer, e.g., a cargo box, may be determined or known. Then, the current height of the trailer may be compared with the determined height for movement, e.g., the desired height, in order to determine whether to adjust the height of the (semi-)autonomous trailer. Further, a control system may command or instruct determination of whether to adjust a height of the (semi-)autonomous trailer.

If it is determined to adjust the height of the (semi-)autonomous trailer, e.g., because the current height does not match the desired height, the process 1100 may proceed to the trailer height adjustment process, as described in the process 800 of FIG. 8.

If, however, it is determined not to adjust the height of the (semi-)autonomous trailer, e.g., because the current height substantially matches the desired height, and/or after completing the trailer height adjustment process 800, the process 1100 may continue with moving the trailer to the staging/storage position based on data, as at 1124. Various data may be captured by sensors onboard the (semi-)autonomous trailer to assist in movement to the staging/storage position, and/or various data may be received from various control systems, communication devices, or other data sources to assist in height determination. The various data may be associated with a starting position, a current position, a destination position, surfaces or obstacles along a pathway and/or within the environment, grades or angles of surfaces, and/or other data. Because the height and/or angle of the cargo box of the (semi-)autonomous trailer may be adjusted to substantially match a desired height and/or angle associated with movement, safety, speed, and/or efficiency of various movement operations may be improved. Further, a control system may command or instruct movement of the (semi-)autonomous trailer.

The process 1100 may proceed with determining a height for staging/storage of the trailer based on data, as at 1126. Various data may be captured by sensors onboard the (semi-)autonomous trailer to assist in height determination, and/or various data may be received from various control systems, communication devices, or other data sources to assist in height determination. The various data may be associated with a staging/storage position, surfaces or obstacles at the staging/storage position and/or within the environment, grades or angles of surfaces, and/or other data. Further, a control system may command or instruct determination of a height for staging/storage of the (semi-)autonomous trailer.

The process 1100 may continue by determining whether to adjust height for staging/storage, as at 1128. For example, a current height of the (semi-)autonomous trailer, e.g., a cargo box, may be determined or known. Then, the current height of the trailer may be compared with the determined height for staging/storage, e.g., the desired height, in order to determine whether to adjust the height of the (semi-)autonomous trailer. Further, a control system may command or instruct determination of whether to adjust a height of the (semi-)autonomous trailer.

If it is determined to adjust the height of the (semi-)autonomous trailer, e.g., because the current height does not match the desired height, the process 1100 may proceed to the trailer height adjustment process, as described in the process 800 of FIG. 8.

If, however, it is determined not to adjust the height of the (semi-)autonomous trailer, e.g., because the current height substantially matches the desired height, and/or after completing the trailer height adjustment process 800, the process 1100 may proceed by holding the (semi-)autonomous trailer at the staging/storage position, as at 1130. For example, the (semi-)autonomous trailer may be staged and/or stored, e.g., within a yard of a facility, for various lengths of time and for various reasons, such as processing speed or operations at the facility, availability of docks, availability of personnel, and/or various other processes or operations related to material handling facilities. Because the height and/or angle of the cargo box of the (semi-)autonomous trailer may be adjusted to substantially match a desired height and/or angle associated with a staging/storage position, safety, ergonomics, speed, and/or efficiency of various staging/storage operations may be improved. Further, a control system may command or instruct staging/storage of the (semi-)autonomous trailer.

After staging/storage of the (semi-)autonomous trailer is complete, and/or if it is determined at step 1118 that the (semi-)autonomous trailer is not to be moved to a staging/storage position, the process 1100 may then end, as at 1132.

As described in FIGS. 8-11B, because the height and/or angle of the cargo box of the trailer may be adjusted to substantially match a desired height and/or angle associated with various operations or processes associated with the trailer, including movement, transport, loading, unloading, sortation, storage, and/or various other operations for the trailer and cargo associated therewith, safety, speed, ergonomics, and/or efficiency of various operations may be improved.

Figure 12:
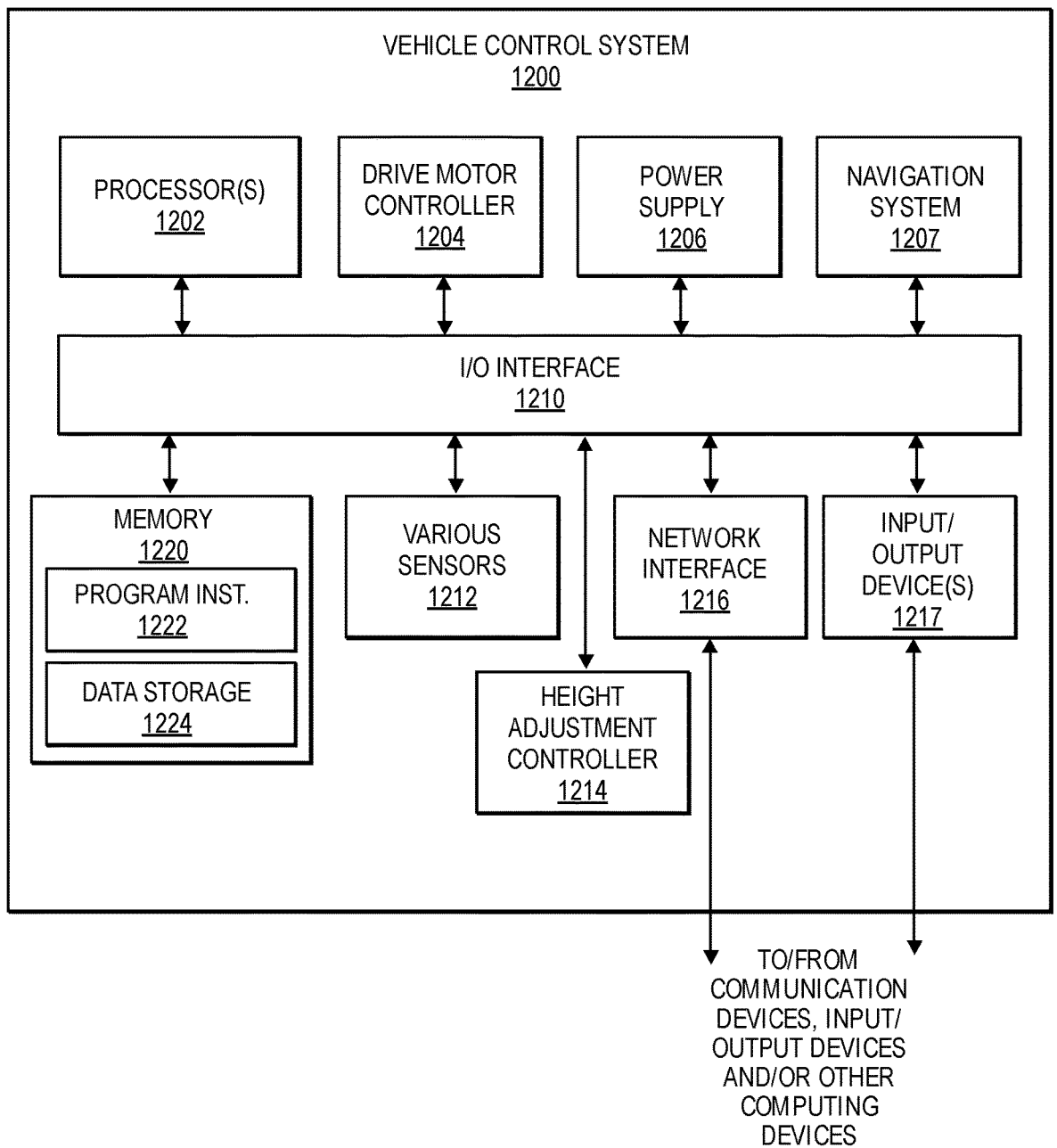
FIG. 12 is a block diagram illustrating various components of an example vehicle control system, in accordance with implementations of the present disclosure.

FIG. 12 is a block diagram illustrating various components of an example vehicle control system 1200, in accordance with implementations of the present disclosure.

In various examples, the block diagram may be illustrative of one or more aspects of the vehicle control system 1200 that may be used to implement the various systems and processes discussed above. In the illustrated implementation, the vehicle control system 1200 includes one or more processors 1202, coupled to a non-transitory computer readable storage medium 1220 via an input/output (I/O) interface 1210. The vehicle control system 1200 may also include a drive motor controller 1204, a power supply or battery 1206, and/or a navigation system 1207. The vehicle control system 1200 may further include one or more sensors 1212 and/or associated sensor controllers, a height adjustment controller 1214, a network interface 1216, and one or more input/output devices 1217.

In various implementations, the vehicle control system 1200 may be a uniprocessor system including one processor 1202, or a multiprocessor system including several processors 1202 (e.g., two, four, eight, or another suitable number). The processor(s) 1202 may be any suitable processor capable of executing instructions. For example, in various implementations, the processor(s) 1202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1202 may commonly, but not necessarily, implement the same ISA.

The non-transitory computer readable storage medium 1220 may be configured to store executable instructions and data, such as truck or tractor data, trailer data, chassis data, cargo box data, drive wheel data, drive motor data, power supply data, suspension linkage data, front wheel data, height adjustment mechanism data, height data, angle data, sensor data, position or location data, process or operation data, and/or other data items accessible by the processor(s) 1202. In various implementations, the non-transitory computer readable storage medium 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1220 as program instructions 1222 and data storage 1224, respectively. In other implementations, program instructions and/or data may be received, sent or stored upon different types of computer-accessible media, such as non-transitory media, or on similar media separate from the non-transitory computer readable storage medium 1220 or the vehicle control system 1200.

Generally, a non-transitory, computer readable storage medium may include storage media or memory media such as magnetic or optical media, e.g., disk or CD/DVD-ROM, coupled to the vehicle control system 1200 via the I/O interface 1210. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1216.

In one implementation, the I/O interface 1210 may be configured to coordinate I/O traffic between the processor(s) 1202, the non-transitory computer readable storage medium 1220, and any peripheral devices, the network interface 1216 or other peripheral interfaces, such as input/output devices 1217. In some implementations, the I/O interface 1210 may perform any necessary protocol, timing or other data transformations to convert data signals from one component (e.g., non-transitory computer readable storage medium 1220) into a format suitable for use by another component (e.g., processor(s) 1202). In some implementations, the I/O interface 1210 may include support for devices attached through various types of peripheral buses, such as a variant of the Peripheral Component Interconnect (PCI) bus standard or the Universal Serial Bus (USB) standard, for example. In some implementations, the function of the I/O interface 1210 may be split into two or more separate components, such as a north bridge and a south bridge, for example. Also, in some implementations, some or all of the functionality of the I/O interface 1210, such as an interface to the non-transitory computer readable storage medium 1220, may be incorporated directly into the processor(s) 1202.

The drive motor controller 1204 may communicate with the navigation system 1207 and adjust the operational characteristics of each drive motor to propel or drive the vehicle, via power from the power supply 1206, along a determined path and/or to perform other navigational maneuvers. The navigation system 1207 may include a GPS or other similar system than can be used to navigate the vehicle to and/or from a location. In addition, the drive motor controller 1204 may communicate with the height adjustment controller 1214 further described herein in order to actuate the drive wheels and adjust positions of suspension linkages, in order to thereby adjust a height and/or angle of the chassis and/or cargo box, as well as to modify a wheelbase of the truck and/or trailer.

The vehicle control system 1200 may also include one or more sensors 1212 and/or associated sensor controllers that may be in communication with the processor(s) 1202, the drive motor controller 1204, the navigation system 1207, the non-transitory computer readable storage medium 1220, and/or other components or systems described herein to capture or receive data associated with various locations or positions in an environment, various obstacles, objects, buildings, facilities, docks, loading/unloading positions, staging/storage positions, or other elements in the environment, aspects, grades, and/or angles of roadways or other surfaces in an environment, and/or other aspects associated with an environment. The various data may be processed and used by the vehicle control system 1200 to control (semi-)autonomous operations of trucks and/or trailers, such as movement, transport, loading, unloading, sortation, storage, height and/or angle adjustment, and/or various other operations.

The vehicle control system 1200 may also include a height adjustment controller 1214 that may be in communication with the processor(s) 1202, the drive motor controller 1204, the navigation system 1207, the various sensors 1212, the non-transitory computer readable storage medium 1220, and/or other components or systems described herein to adjust a height and/or angle of at least one of a chassis or cargo box of a truck and/or trailer. For example, based on data from one or more sensors, the height and/or angle of the chassis or cargo box of a truck and/or trailer may be adjusted for various operations, such as movement, transport, loading, unloading, sortation, storage, and/or various other operations. As described herein, the height adjustment controller 1214 may communicate with drive motors and lock mechanisms associated with suspension linkages, in order to selectively prevent and allow relative movement or rotation between the suspension linkages and drive motors. In such example embodiments, the movement or rotation of the suspension linkages may cause adjustment to a height and/or angle of the chassis and/or cargo box, which may also cause adjustment to a wheelbase of the truck and/or trailer.

The network interface 1216 may be configured to allow data to be exchanged between the vehicle control system 1200, other devices attached to a network, such as other computer systems, control systems of various facilities, vehicles, or other devices, communication devices, various sensors, and/or other systems, machines, equipment, apparatus, or devices. For example, the network interface 1216 may enable wireless communication between vehicles, control systems of facilities, and/or communication devices utilized by facility personnel. In various implementations, the network interface 1216 may support communication via wireless general data networks, such as a Wi-Fi network. For example, the network interface 1216 may support communication via telecommunications networks such as cellular communication networks, satellite networks, and the like.

Input/output devices 1217 may, in some implementations, include one or more displays, screens, monitors, cameras, imaging sensors, image capture devices, or other visual input/output devices, speakers, microphones, or other audio input/output devices, thermal sensors, infrared sensors, depth sensors, radar, LIDAR, or other time of flight sensors, accelerometers, gyroscopes, magnetometers, pressure sensors, weather sensors, various other sensors described herein, etc. Multiple input/output devices 1217 may be present and controlled by the vehicle control system 1200. One or more of these sensors may be utilized to assist in performing the various functions, operations, and processes described herein.

As shown in FIG. 12, the memory 1220 may include program instructions 1222 which may be configured to implement the example processes and/or sub-processes described above. The data storage 1224 may include various data stores for maintaining data items that may be provided for performing the various functions, operations, and processes described herein.

Those skilled in the art will appreciate that the vehicle control system 1200 is merely illustrative and is not intended to limit the scope of the present disclosure. In particular, the computing system and devices may include any combination of hardware or software that can perform the indicated functions, including other control systems or controllers, computers, network devices, internet appliances, PDAs, wireless phones, pagers, etc. The vehicle control system 1200 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

While the above examples have been described with respect to trucks, tractors, and/or trailers, the disclosed implementations may also be used for other forms of vehicles, including, but not limited to automobiles, sedans, minivans, pickup trucks, cargo vans, or other ground based vehicles.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 8-11B, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A height adjustable trailer, comprising:
   a chassis;
   a cargo box;
   a left side drive motor, the left side drive motor operatively coupled to at least one of the chassis or the cargo box via a left side trailing arm suspension link;
   a right side drive motor, the right side drive motor operatively coupled to at least one of the chassis or the cargo box via a right side trailing arm suspension link;
   wherein the left side and right side drive motors are configured to modify positions of the left side and right side trailing arm suspension links; and
   wherein modifying positions of the left side and right side trailing arm suspension links causes adjustment to a height of the cargo box.

2. The height adjustable trailer of claim 1, further comprising:
   a left side lock configured to selectively maintain or release a position of the left side trailing arm suspension link relative to the left side drive motor; and
   a right side lock configured to selectively maintain or release a position of the right side trailing arm suspension link relative to the right side drive motor.

3. The height adjustable trailer of claim 1, wherein the cargo box is configured to move relative to a height of the chassis.

4. The height adjustable trailer of claim 1, wherein modifying positions of the left side and right side trailing arm suspension links further causes adjustment to a wheelbase of the trailer.

5. The height adjustable trailer of claim 1, further comprising:
   a left side power supply configured to provide power to the left side drive motor; and
   a right side power supply configured to provide power to the right side drive motor.

6. A height adjustment apparatus, comprising:
   a power supply;
   a drive wheel;
   a drive motor configured to rotate the drive wheel via power from the power supply; and
   a suspension linkage pivotably coupled between the drive motor and at least one of a chassis or a cargo box associated with a transport vehicle;
   wherein the drive motor is configured to modify a position of the suspension linkage, thereby causing an adjustment to a height of at least one of the chassis or the cargo box.

7. The height adjustment apparatus of claim 6, further comprising:
   a lock configured to selectively maintain or release a position of the suspension linkage relative to the drive motor.

8. The height adjustment apparatus of claim 6, wherein modifying the position of the suspension linkage further causes adjustment to a wheelbase of the transport vehicle.

9. The height adjustment apparatus of claim 8, wherein:
   a first position of the suspension linkage is associated with a shortened wheelbase and a raised height of at least one of the chassis or the cargo box;
   a second position of the suspension linkage is associated with a nominal wheelbase and a nominal height of at least one of the chassis or the cargo box; and
   a third position of the suspension linkage is associated with a lengthened wheelbase and a lowered height of at least one of the chassis or the cargo box.

10. The height adjustment apparatus of claim 6, wherein the transport vehicle comprises a left side height adjustment apparatus and a right side height adjustment apparatus having respective power supplies, drive wheels, drive motors, and suspension linkages.

11. The height adjustment apparatus of claim 6, wherein the transport vehicle comprises at least one of a trailer or a truck.

12. The height adjustment apparatus of claim 6, further comprising:
   a front wheel having an adjustable height.

13. The height adjustment apparatus of claim 12, wherein the front wheel is associated with a front height adjustment apparatus further including:
   a front power supply;
   a front drive motor configured to rotate the front wheel via power from the front power supply; and
   a front suspension linkage pivotably coupled between the front drive motor and at least one of the chassis or the cargo box associated with the transport vehicle.

14. The height adjustment apparatus of claim 6, further comprising:
   at least one sensor associated with the transport vehicle, the at least one sensor configured to capture data associated with an environment around the transport vehicle.

15. The height adjustment apparatus of claim 14, further comprising:
   a vehicle control system configured to at least:
      receive data from the at least one sensor;
      determine a desired height of at least one of the chassis or the cargo box;
      determine a desired position of the suspension linkage based on the desired height; and
      instruct the drive motor to move the suspension linkage to the desired position.

16. A method, comprising:
   determining, by a control system, to adjust a height of at least one of a chassis or a cargo box associated with a transport vehicle to a desired height;
   determining, by the control system, a desired position of a suspension linkage based on the desired height, the suspension linkage being pivotably coupled between a drive motor and at least one of the chassis or the cargo box; and
   instructing, by the control system, movement of a drive wheel by the drive motor, via power from a power supply, to modify a position of the suspension linkage to the desired position, thereby causing adjustment to the height of at least one of the chassis or the cargo box to the desired height.

17. The method of claim 16, wherein instructing movement of the drive wheel to modify the position of the suspension linkage to the desired position further causes adjustment to a wheelbase of the transport vehicle.

18. The method of claim 16, further comprising:
   instructing, by the control system, release of a lock associated with the suspension linkage to enable modification of the position of the suspension linkage to the desired position.

19. The method of claim 16, further comprising:
   determining, by the control system, a desired front height of a front wheel based on the desired height; and
   instructing, by the control system, adjustment to a height of the front wheel to the desired front height.

20. The method of claim 18, further comprising:
instructing, by the control system, actuation of the lock associated with the suspension linkage to maintain the position of the suspension linkage at the desired position.

\* \* \* \* \*